US012560473B2

(12) United States Patent (10) Patent No.: US 12,560,473 B2
Yamada (45) Date of Patent: Feb. 24, 2026

(54) LASER INTERFEROMETER

(71) Applicant: SEIKO EPSON CORPORATION,
Tokyo (JP)

(72) Inventor: Kohei Yamada, Shiojiri (JP)

(73) Assignee: SEIKO EPSON CORPORATION (JP)

( * ) Notice: Subject to any disclaimer, the term of this
patent is extended or adjusted under 35
U.S.C. 154(b) by 319 days.

(21) Appl. No.: 18/364,715

(22) Filed: Aug. 3, 2023

(65) Prior Publication Data

US 2024/0044698 A1 Feb. 8, 2024

(30) Foreign Application Priority Data

Aug. 4, 2022 (JP) ................................. 2022-125103

(51) Int. Cl.
*G01H 9/00* (2006.01)
*G02B 26/08* (2006.01)
(52) U.S. Cl.
CPC ........... *G01H 9/00* (2013.01); *G02B 26/0808*
(2013.01)
(58) Field of Classification Search
CPC ...... G01H 9/00; G02B 26/06; G02B 26/0808;
G01N 29/2418; G01N 21/1702
See application file for complete search history.

(56) References Cited

U.S. PATENT DOCUMENTS 5,815,267 A 9/1998 Kato et al.
5,831,720 A 11/1998 Ishida et al.

10,088,292 B2 * 10/2018 Perea ................. G01B 9/02038
2020/0309953 A1 10/2020 Yamada
2022/0065612 A1 3/2022 Yamada
(Continued)

FOREIGN PATENT DOCUMENTS

JP H02-038889 A 2/1990
JP H08-292265 A 11/1996
JP H09-054293 A 2/1997
(Continued)

*Primary Examiner* — Georgia Y Epps
*Assistant Examiner* — Erin R Garber
(74) *Attorney, Agent, or Firm* — Harness, Dickey &
Pierce, P.L.C.

(57) ABSTRACT

A laser interferometer includes: a light source configured to
emit laser light; an optical modulator including a vibrator
driven by a drive signal and configured to superimpose a
modulation signal on the laser light; a photodetector con-
figured to receive the laser light including the modulation
signal and a sample signal derived from an object and output
a light receiving signal; a calculator configured to demodu-
late the sample signal from the light receiving signal based
on a reference signal; and a signal generator configured to
output the drive signal and the reference signal. The optical
modulator includes: the vibrator including a first vibration
portion and a second vibration portion that vibrates in a
phase opposite to that of the first vibration portion; a first
optical modulator provided in the first vibration portion and
configured to modulate the laser light; a second optical
modulator provided in the second vibration portion and
configured to modulate the laser light modulated by the first
optical modulator; and a detour optical path configured to
cause the laser light modulated by the first optical modulator
to enter the second optical modulator.

15 Claims, 15 Drawing Sheets

(56) References Cited

U.S. PATENT DOCUMENTS

| 2022/0065613 | A1 | 3/2022 | Kitagawa |
| 2022/0065614 | A1 | 3/2022 | Yamada et al. |

FOREIGN PATENT DOCUMENTS

| JP | H09-113523 | A | 5/1997 |
| JP | 2007-285898 | A | 11/2007 |
| JP | 2020-165700 | A | 10/2020 |
| JP | 2022-038156 | A | 3/2022 |
| JP | 2022-038157 | A | 3/2022 |
| JP | 2022-038678 | A | 3/2022 |

* cited by examiner

PASS 1

PASS 2

LASER INTERFEROMETER

The present application is based on, and claims priority from JP Application Serial Number 2022-125103, filed Aug. 4, 2022, the disclosure of which is hereby incorporated by reference herein in its entirety.

BACKGROUND

1. Technical Field

The present disclosure relates to a laser interferometer.

2. Related Art

JP-A-9-54293 discloses a Laser Doppler velocity meter (laser interferometer) that irradiates a vibrating object with a laser beam and measures a velocity of the object by using a frequency of the laser beam that changes due to the Doppler effect. The Laser Doppler velocity meter requires a structure for modulating light emitted from a laser light source in order to detect directivity of a vibration phenomenon of the object. Therefore, JP-A-9-54293 discloses use of an acousto-optic modulator and an electro-optic modulator.

JP-A-2007-285898 discloses a laser vibrometer (laser interferometer) using a vibrator such as a piezo element or a quartz crystal vibrator instead of an expensive acousto-optic modulator (AOM). By irradiating the vibrator with laser light, a frequency of the laser light is shifted. By using the laser light whose frequency is shifted in this manner as reference light, a Doppler signal is demodulated based on scattered laser light which is subjected to the Doppler shift by a vibrating object. A vibration velocity of the object can be measured based on the Doppler signal. According to such a laser vibrometer, since an inexpensive vibrator can be used, cost reduction of the laser vibrometer is achieved.

On the other hand, JP-A-2-38889 discloses a Laser Doppler velocity meter that receives, using a light detection element, a reference light beam obtained by applying a sine wave signal to an optical modulator and frequency-deviating a light beam from a laser light source, and a reflected light beam obtained by irradiating an object to be measured with the light beam, performs predetermined calculation processing on a light receiving signal, and then performs FM demodulation processing. In such a Laser Doppler velocity meter, by performing the predetermined calculation processing before the FM demodulation processing, even when the frequency of the reference light beam is deviated in a sine wave shape, a signal corresponding to a velocity of the object to be measured can be obtained from the light receiving signal.

In a laser interferometer using a vibrator, a velocity of an object to be measured cannot be correctly measured in certain cases. Specifically, depending on vibration conditions of the vibrator, intensity of a modulation signal in reference light is significantly reduced. In such a case, a Doppler signal derived from the object to be measured cannot be demodulated with high accuracy.

SUMMARY

A laser interferometer according to an application example of the present disclosure includes:

a light source configured to emit laser light;

an optical modulator including a vibrator driven by a drive signal and configured to superimpose a modulation signal on the laser light using the vibrator;

a photodetector configured to receive the laser light including the modulation signal and a sample signal derived from an object and output a light receiving signal;

a calculator configured to demodulate the sample signal from the light receiving signal based on a reference signal; and a signal generator configured to output the drive signal and the reference signal, in which the optical modulator includes the vibrator including a first vibration portion and a second vibration portion that vibrates in a phase opposite to that of the first vibration portion, a first optical modulator provided in the first vibration portion and configured to modulate the laser light, a second optical modulator provided in the second vibration portion and configured to modulate the laser light modulated by the first optical modulator, and a detour optical path configured to cause the laser light modulated by the first optical modulator to enter the second optical modulator.

DESCRIPTION OF EMBODIMENTS

Hereinafter, a laser interferometer according to the present disclosure will be described in detail based on embodiments shown in the accompanying drawings.

1. First Embodiment

First, a laser interferometer according to a first embodiment will be described.

Figure 1:
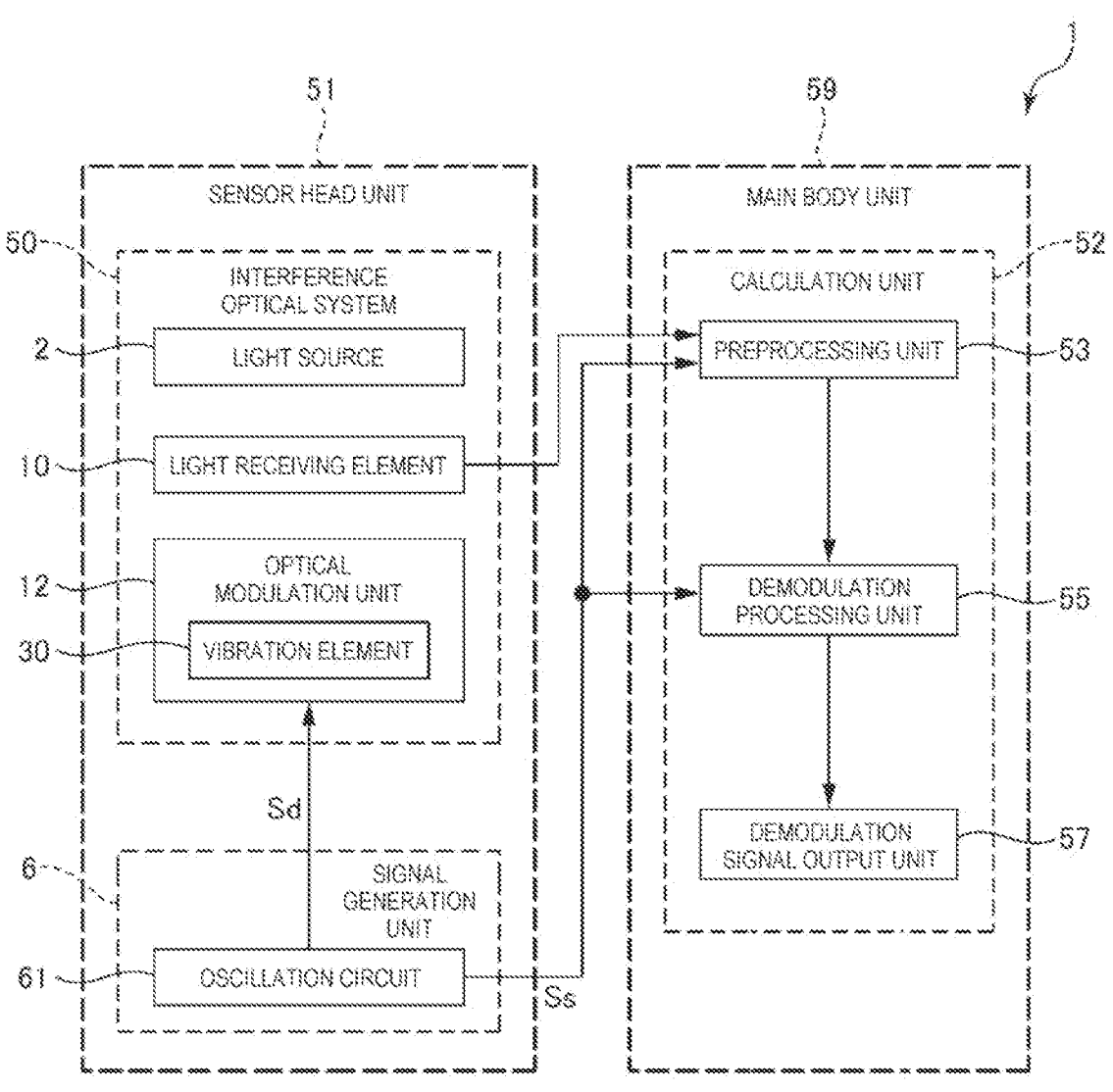
FIG. 1 is a functional block diagram showing a laser interferometer according to a first embodiment.
Figure 2:
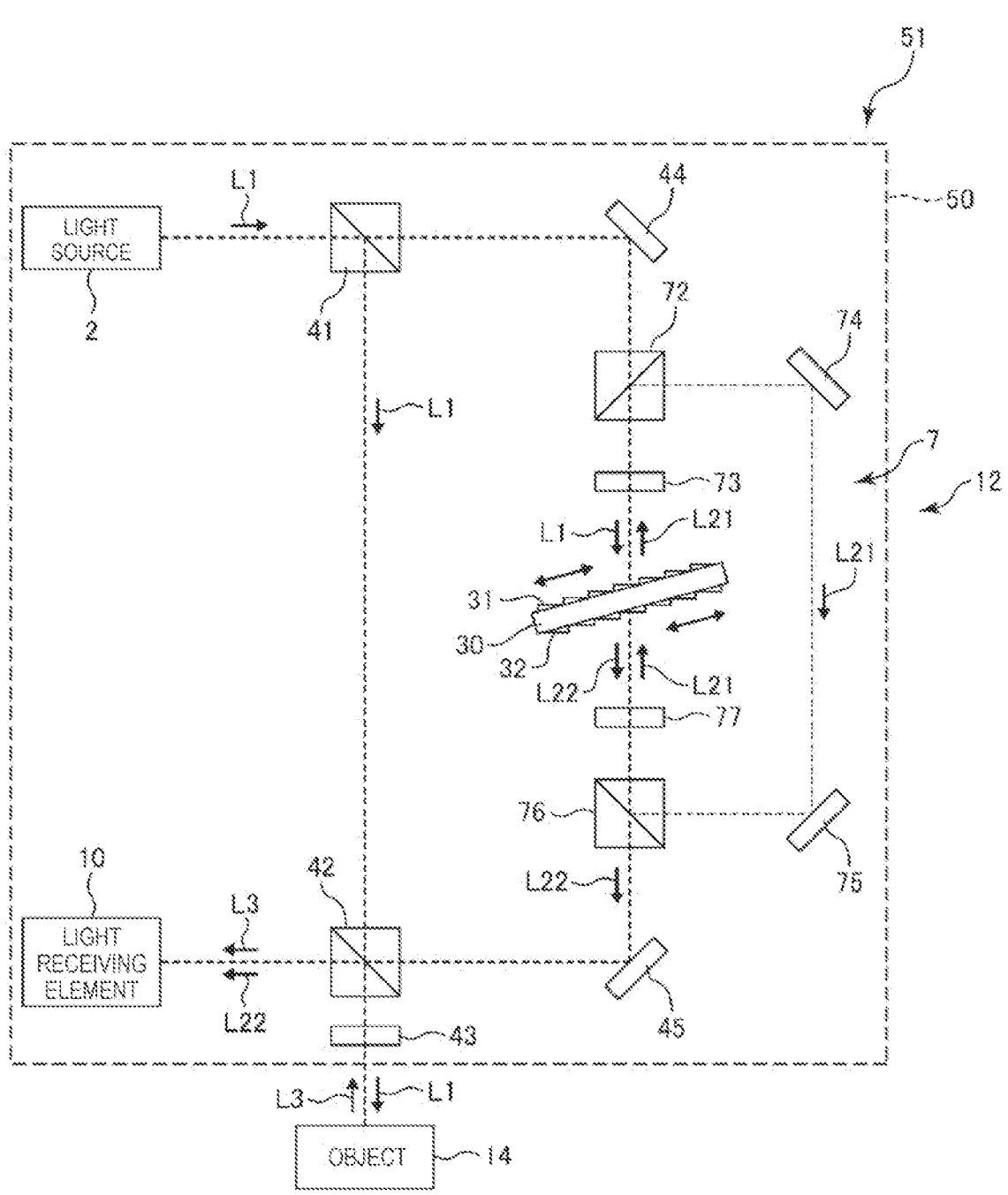
FIG. 2 is a schematic configuration diagram showing a sensor head unit provided in the laser interferometer in FIG. 1.

FIG. 1 is a functional block diagram showing a laser interferometer 1 according to the first embodiment. FIG. 2 is a schematic configuration diagram showing a sensor head unit 51 provided in the laser interferometer 1 in FIG. 1.

The laser interferometer 1 shown in FIG. 1 includes the sensor head unit 51 and a main body unit 59. The sensor head unit 51 can be easily reduced in size and weight, and is easily portable and easy to install. Therefore, the sensor head unit 51 can be disposed near an object 14 shown in FIG. 2, which is an object to be measured by the laser interferometer 1, for example. The main body unit 59 can be disposed away from the sensor head unit 51, and may be accommodated in, for example, a rack.

The sensor head unit 51 shown in FIG. 1 includes an interference optical system 50 and a signal generator 6. The main body unit 59 includes a calculator 52.

1.1. Sensor Head Unit 1.1.1. Interference Optical System

The interference optical system 50 is a Michelson type interference optical system. As shown in FIG. 2, the interference optical system 50 includes a light source 2, beam splitters 41 and 42, a quarter-wave plate 43, mirrors 44 and 45, an optical modulator 12, and a light receiving element 10.

The light source 2 emits laser light L1. The optical modulator 12 includes a vibrator 30 and a detour optical path 7, and changes a phase of the laser light L1 and superimposes a modulation signal on the laser light L1.

The laser light L1 emitted from the light source 2 enters the beam splitter 41 and is split into two. One of the laser light L1 is directed to the detour optical path 7 via the mirror 44, and the other laser light L1 is directed to the beam splitter 42.

The detour optical path 7 shown in FIG. 2 is an optical path that guides the laser light L1 such that the one laser light L1 is emitted twice toward the vibrator 30.

The vibrator 30 includes a first vibration portion 31 and a second vibration portion 32 that vibrate in opposite phases to each other, and superimposes the modulation signal on the laser light L1 using the first vibration portion 31 and the second vibration portion 32. In the present specification, the superimposition of the modulation signal on the laser light by an interaction between a structure provided in the vibrator 30 and the laser light is referred to as "superimpose the modulation signal on the laser light using the vibrator".

When the first vibration portion 31 of the vibrator 30 is irradiated with the laser light L1 by the first irradiation, a modulation signal for modulating a phase is added, and laser light L21 is generated. The laser light L21 is emitted toward the second vibration portion 32 of the vibrator 30 via the detour optical path 7. That is, the detour optical path 7 has a function of detouring laser light such that the first vibration portion 31 and the second vibration portion 32 which vibrate in opposite phases to each other are irradiated with the laser light. The modulation signal is added again to the laser light L21 by the second irradiation, and laser light L22 is generated. That is, the laser light L22 is light obtained by performing phase modulation twice on the laser light L1. Here, since the first vibration portion 31 and the second vibration portion 32 vibrate in opposite phases to each other, the phase of the laser light L1 can be shifted in the same direction in two times of irradiation. The generated laser light L22 enters the beam splitter 42 via the mirror 45. Then, the laser light L22 passes through the beam splitter 42 and enters the light receiving element 10.

After entering the beam splitter 42, the other laser light L1 passes through the quarter-wave plate 43 and enters the object 14. A sample signal is added to the laser light L1 entering the object 14 according to a velocity and a position of the object 14. Accordingly, the laser light L1 is reflected as laser light L3 including the sample signal derived from the object 14. The laser light L3 passes through the quarter-wave plate 43 again, returns to the beam splitter 42, and is then reflected by the beam splitter 42 and enters the light receiving element 10.

The light receiving element 10 receives the entered laser light L22 and L3, and converts the intensity of the received laser light L22 and L3 into an electric signal.

Hereinafter, units of the interference optical system 50 will be further described.

1.1.1.1. Light Source

The light source 2 is a laser light source that emits the laser light L1 having coherence. A light source having a line width of a band of MHz or less may be used as the light source 2. Specific examples thereof include a gas laser such as a He—Ne laser, and a semiconductor laser element such as a distributed feedback-laser diode (DFB-LD), a fiber bragg grating laser diode (FBG-LD), a vertical cavity surface emitting laser (VCSEL) diode, and a fabry-perot laser diode (FP-LD).

In particular, the light source 2 is preferably a semiconductor laser element. Accordingly, it is possible to reduce a size of the light source 2 in particular. Therefore, it is possible to reduce a size of the laser interferometer 1.

1.1.1.2. Beam Splitter

The beam splitter 41 is a polarization beam splitter disposed between the light source 2 and the mirror 44. The beam splitter 41 has a function of transmitting P-polarized light and reflecting S-polarized light. With this function, the beam splitter 41 splits the laser light L1 into two. Accordingly, the one laser light L1 described above is the P-polarized light, and the other laser light L1 is the S-polarized light. The laser light L1 entering the beam splitter 41 may pass through any optical element such that an intensity ratio of the P-polarized light and the S-polarized light is, for example, 50:50.

The one laser light L1, which is the P-polarized light passing through the beam splitter 41, is reflected by the mirror 44 and enters the detour optical path 7. The phase of the laser light L1 entering the detour optical path 7 is modulated twice by the vibrator 30, and the laser light L1 becomes the laser light L22. The laser light L22 enters the beam splitter 42.

The other laser light L1, which is the S-polarized light reflected by the beam splitter 41, is converted into P-polarized light by a half-wave plate (not shown), and enters the beam splitter 42. The beam splitter 42 is a polarization beam splitter disposed between the beam splitter 41 and the quarter-wave plate 43 and between the mirror 45 and the light receiving element 10. The beam splitter 42 transmits the P-polarized light and reflects the S-polarized light. With this function, the other laser light L1 enters the object 14 via the quarter-wave plate 43. The laser light L1 entering the object 14 is subjected to a Doppler shift of $f_d$ [Hz]. Accordingly, the laser light L3 including the sample signal derived from the object 14 is generated. The laser light L3 returns to the beam splitter 42 again via the quarter-wave plate 43. Since the laser light L3 is S-polarized light, the laser light L3 is reflected by the beam splitter 42 and enters the light receiving element 10.

The beam splitter 41 may be a non-polarization beam splitter. In this case, an optical element for controlling polarized light may be provided between the beam splitter 41 and the detour optical path 7 and between the beam splitter 41 and the beam splitter 42.

1.1.1.3. Detour Optical Path

The detour optical path 7 optically couples the mirror 44 and the mirror 45, and causes the laser light L1 to be emitted twice toward the vibrator 30.

The detour optical path 7 includes a beam splitter 72, a quarter-wave plate 73, a mirror 74, a mirror 75, a beam splitter 76, and a quarter-wave plate 77.

The beam splitter 72 has a function of switching optical paths of the laser light L1 and L21 according to, for example, polarized light. Specifically, the beam splitter 72 transmits the P-polarized light and reflects the S-polarized light. Since the laser light L1 passing through the beam splitter 41 and reflected by the mirror 44 is P-polarized light, the laser light L1 passes through the beam splitter 72 and enters the vibrator 30 via the quarter-wave plate 73.

The vibrator 30 includes the first vibration portion 31 and the second vibration portion 32 that vibrate in opposite phases to each other. The detour optical path 7 detours the laser light such that the first vibration portion 31 and the second vibration portion 32 are irradiated with the laser light once.

The laser light L1 is first reflected by the first vibration portion 31 of the vibrator 30. At this time, the laser light L1 is subjected to a phase shift of $+\Phi_m$ [Hz]. A phase shift amount $\Phi_m$ is represented by $\Phi_m = B \sin(2\pi f_m t)$. B is a phase deviation (B value) of a modulation signal added by a phase shift, $f_m$ is a frequency of the modulation signal, and t is time. By the phase shift, a modulation signal for modulating the phase is added to the laser light L1, and the laser light L21 is generated. The generated laser light L21 returns to the beam splitter 72 again via the quarter-wave plate 73. Since the laser light L21 is S-polarized light, the laser light L21 is reflected by the beam splitter 72, is sequentially reflected by the mirrors 74 and 75, and enters the beam splitter 76.

The beam splitter 76 has a function of switching optical paths of the laser light L21 and L22 according to, for example, polarized light. Specifically, the beam splitter 76 transmits the P-polarized light and reflects the S-polarized light. Therefore, the laser light L21 is reflected by the beam splitter 76 and enters the vibrator 30 via the quarter-wave plate 77.

The laser light L21 is reflected by the second vibration portion 32 of the vibrator 30. At this time, the laser light L21 is subjected to a phase shift of $+\Phi_m$ [Hz]. Accordingly, a modulation signal for modulating the phase is added to the laser light L21, and the laser light L22 is generated. As a result, the laser light L22 includes a modulation signal corresponding to a phase shift of $+2\Phi_m$ [Hz]. The generated laser light L22 returns to the beam splitter 76 again via the quarter-wave plate 77. Since the laser light L22 is P-polarized light, the laser light L22 passes through the beam splitter 76, is reflected by the mirror 45, and enters the beam splitter 42. Then, the laser light L22 passes through the beam splitter 42 and enters the light receiving element 10.

In the beam splitter 42, the laser light L22 and the laser light L3 interfere with each other, and interference light is generated. The interference light has a beat of an S/N ratio higher than that in the related art. The calculator 52 can finally calculate the velocity and the position of the object 14 with high accuracy based on a frequency and a phase of the beat.

As described above, in the detour optical path 7 shown in FIG. 2, by using the beam splitters 72 and 76 and the quarter-wave plates 73 and 77, the vibrator 30 can be irradiated with the laser light twice.

1.1.1.4. Light Receiving Element

When the interference light enters the light receiving element 10, the light receiving element 10 outputs an optical current (light receiving signal) corresponding to the intensity of the interference light. By demodulating the sample signal from the light receiving signal by a method to be described later, motion, that is, the velocity and the position of the object 14 can be finally obtained. Examples of the light receiving element 10 include a photodiode and a phototransistor. Light received by the light receiving element 10 only needs to be laser light including a sample signal and a modulation signal, and is different depending on a configuration of an optical system, and thus is not limited to the above-described interference light. In the present specification, "demodulating the sample signal from the light receiving signal" includes demodulating the sample signal from various signals converted from an optical current (light receiving signal).

1.1.1.5. Vibrator

Figure 3:
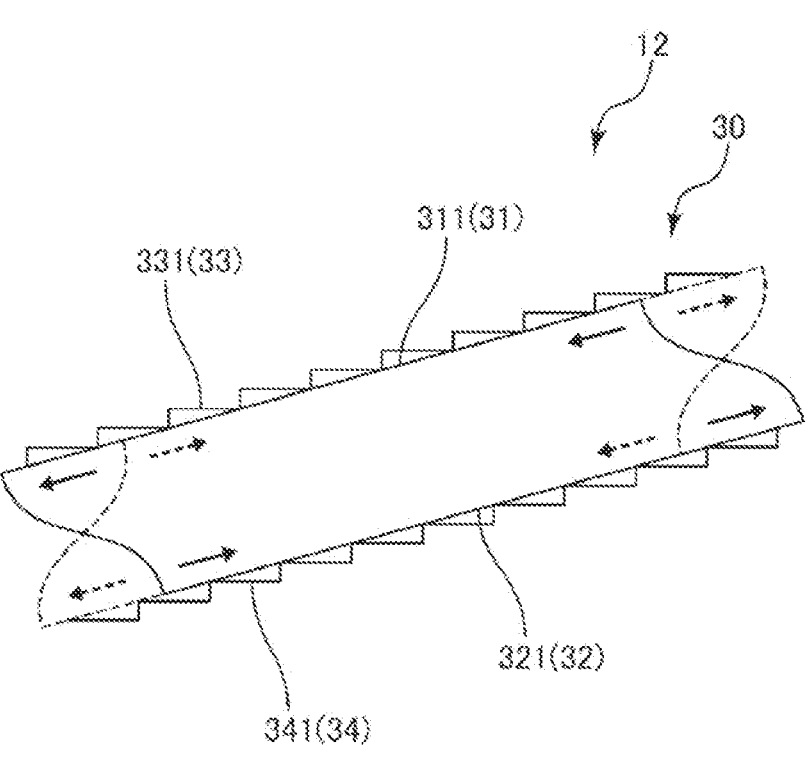
FIG. 3 is a diagram showing a schematic configuration of a vibrator provided in an optical modulator in FIG. 2.

FIG. 3 is a diagram showing a schematic configuration of the vibrator 30 provided in the optical modulator 12 in FIG. 2.

The vibrator 30 shown in FIG. 3 has a plate shape, and repeats vibration in a mode (thickness-shear vibration mode) in which the vibrator 30 is distorted in a direction along a surface of the vibrator 30 by applying a potential. An element that vibrates in such a mode is referred to as a thickness-shear vibrator. Examples of the thickness-shear vibrator include an AT quartz crystal vibrator and a BT quartz crystal vibrator. These quartz crystal vibrators include a quartz crystal element which is a piezoelectric element and an electrode provided on the quartz crystal element. In the quartz crystal vibrator, a modulation signal having a high S/N ratio can be added to the laser light L1 by using a fairly high Q value of the quartz crystal.

The vibrator 30 shown in FIG. 3 includes a first surface 311 that is the first vibration portion 31 and a second surface 321 that is the second vibration portion 32. The first surface 311 (the first vibration portion 31) and the second surface 321 (the second vibration portion 32) shown in FIG. 3 vibrate in opposite phases to each other. The phrase "vibrate in opposite phases to each other" means that the first surface 311 and the second surface 321 vibrate along the same vibration axis such that the first surface 311 and the second surface 321 have opposite phases to each other.

The first surface 311 is provided with a first diffraction grating 331 that is a first optical modulator 33, and the second surface 321 is provided with a second diffraction grating 341 that is a second optical modulator 34. Examples of the first diffraction grating 331 and the second diffraction grating 341 include a blazed diffraction grating shown in FIG. 3 and a laminar diffraction grating.

The vibrator 30 oscillates based on a drive signal Sd output from the signal generator 6. Power (drive power) required for the oscillation of the vibrator 30 is not particularly limited, and is as small as about 0.1 μW to 100 mW. Therefore, by providing the vibrator 30, it is possible to reduce the size, weight, and power consumption of the laser interferometer 1. The thickness-shear vibrator is also useful in terms of impact resistance and temperature characteristics as compared with elements having other vibration modes.

In FIG. 3, solid line arrows and broken line arrows indicating deformation directions of the vibrator 30 are shown. A voltage causing the deformation indicated by the solid line arrows and a voltage causing the deformation indicated by the broken line arrows are opposite to each other. Therefore, the first surface 311 (the first vibration portion 31) and the second surface 321 (the second vibration portion 32) of the vibrator 30 shown in FIG. 3 vibrate in opposite phases to each other. As a result, when the first diffraction grating 331 is irradiated with laser light and then the second diffraction grating 341 is irradiated with the laser light, the phase of the laser light can be shifted in the same direction in the two times of irradiation.

For example, when the first surface 311 (the first vibration portion 31) shown in FIG. 3 is displaced as indicated by the broken line arrows, the second surface 321 (the second vibration portion 32) is displaced as indicated by the broken line arrows in synchronization with the displacement of the first surface 311. Accordingly, after the phase shift of $+\Phi_m$ [Hz] is applied by irradiating the first diffraction grating 331 provided on the first surface 311 with the laser light L1, the phase shift of $+\Phi_m$ [Hz] can be applied even when the second diffraction grating 341 provided on the second surface 321 is irradiated with the laser light L21. This is because the first surface 311 and the second surface 321 vibrate in opposite phases to each other, the velocity of light is very large, and an amount of delay caused by the two times of irradiation can be substantially ignored. As described above, the laser light L22 including the modulation signal corresponding to the phase shift of $+2\Phi_m$ [Hz] is obtained.

The vibrator 30 is not limited to a quartz crystal vibrator, and may be a silicon vibrator or a ceramic vibrator. In addition to the first vibration portion 31 and the second vibration portion 32, the vibrator 30 may include a third vibration portion and a fourth vibration portion as additional vibration portions, or may have four or more vibration portions. In this case, the additional vibration portions are vibrated in synchronization with the first vibration portion 31 or the second vibration portion 32, and the additional vibration portions are irradiated with the laser light to further increase the phase shift amount.

1.1.2. Signal Generator

The signal generator 6 shown in FIG. 1 outputs the drive signal Sd, which is input to the vibrator 30, and a reference signal Ss input to the calculator 52.

In the embodiment, as shown in FIG. 1, the signal generator 6 includes an oscillation circuit 61. The oscillation circuit 61 operates using the vibrator 30 as a signal source, and generates a periodic signal with high accuracy. Accordingly, the oscillation circuit 61 outputs the drive signal Sd with high accuracy and outputs the reference signal Ss. Accordingly, the drive signal Sd and the reference signal Ss are affected in the same way when subjected to disturbance. Accordingly, the modulation signal, which is added via the vibrator 30 driven by the drive signal Sd, and the reference signal Ss are also affected in the same way. Therefore, when the modulation signal and the reference signal Ss are subjected to calculation in the calculator 52, the influence of disturbance included in both of the modulation signal and the reference signal Ss can be offset or reduced in the process of calculation. As a result, the calculator 52 can accurately obtain the position and the velocity of the object 14 even when subjected to disturbance.

Examples of the oscillation circuit 61 include an oscillation circuit disclosed in JP-A-2022-38156.

The signal generator 6 may include a signal generation device such as a function generator or a signal generator, instead of the oscillation circuit 61.

1.2. Main Body Unit 1.2.1. Calculator

The main body unit 59 includes the calculator 52. The calculator 52 includes a preprocessing unit 53, a demodulation processing unit 55, and a demodulation signal output unit 57.

The calculator 52 shown in FIG. 1 includes the preprocessing unit 53, the demodulation processing unit 55, and the demodulation signal output unit 57. Functions of these functional units are implemented by, for example, hardware including a processor, a memory, an external interface, an input unit, and a display unit. Specifically, the processor reads and executes a program stored in the memory, thereby implementing the functions. These components can communicate with one another via an internal bus.

Examples of the processor include a central processing unit (CPU) and a digital signal processor (DSP). Instead of a method in which the processor executes software, a method in which a field-programmable gate array (FPGA), an application specific integrated circuit (ASIC), and the like implements the above-described functions may be adopted.

Examples of the memory include a hard disk drive (HDD), a solid state drive (SSD), an electrically erasable programmable read-only memory (EEPROM), a read-only memory (ROM), and a random access memory (RAM).

Examples of the external interface include a digital input and output port such as a universal serial bus (USB), and an Ethernet (registered trademark) port.

Examples of the input unit include various input devices such as a keyboard, a mouse, a touch panel, and a touch pad. Examples of the display unit include a liquid crystal display panel and an organic electro luminescence (EL) display panel.

The external interface, the input unit, and the display unit may be provided as necessary, and may be omitted.

As the preprocessing unit 53 and the demodulation processing unit 55, for example, a preprocessing unit and a demodulation unit disclosed in JP-A-2022-38156 can be applied.

The preprocessing unit 53 performs preprocessing on the light receiving signal based on the reference signal Ss. In the preprocessing, after the light receiving signal is divided into two signals PASS1 and PASS2, one of the two signals PASS1 and PASS2 is multiplied by the reference signal, and then the two signals PASS1 and PASS2 are summed, and are output as a preprocessed signal.

The demodulation processing unit 55 demodulates, from the preprocessed signal output from the preprocessing unit 53, the sample signal corresponding to the velocity and the position of the object 14 based on the reference signal Ss.

The demodulation signal output unit 57 performs phase coupling by performing, for example, phase unwrapping processing on a demodulated signal output from the demodulation processing unit 55. Accordingly, the position of the object 14 is calculated. Accordingly, the laser interferometer 1 is a displacement gauge. The velocity can be obtained based on the position of the object 14. Accordingly, the laser interferometer 1 is a velocity meter.

1.2.2. Relationship Between Phase Deviation (B Value) and S/N Ratio (Signal to Noise Ratio) of Modulation Signal The modulation signal added by the optical modulator 12 has a parameter of a phase deviation (B value). The B value affects an S/N ratio (signal to noise ratio) of the preprocessed signal output from the preprocessing unit 53. Specifically, as the B value is increased, the S/N ratio of the preprocessed signal is higher. By increasing the S/N ratio of the preprocessed signal, the sample signal (Doppler signal) derived from the object 14 finally calculated by the calculator 52 can be demodulated with higher accuracy regardless of vibration conditions such as a small amplitude of the vibration of the vibrator 30. As a result, it is possible to implement the laser interferometer 1 having high calculation accuracy for the position and the velocity of the object 14.

Figure 4:
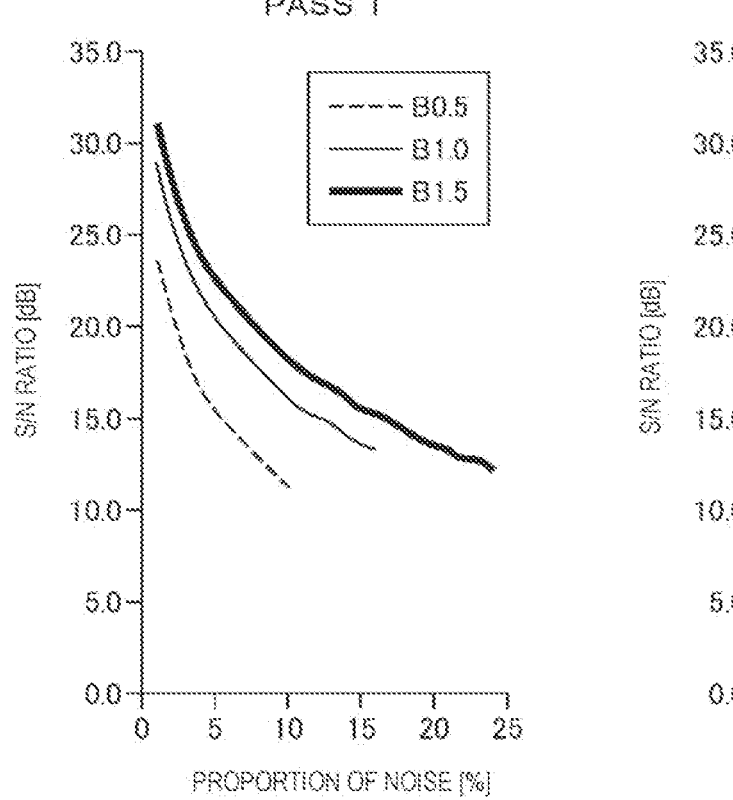
FIG. 4 is a graph showing a relationship between a proportion of noise mixed in a modulation signal and an S/N ratio of two signals PASS1 and PASS2 generated inside a preprocessing unit shown in FIG. 1.
Figure 4:
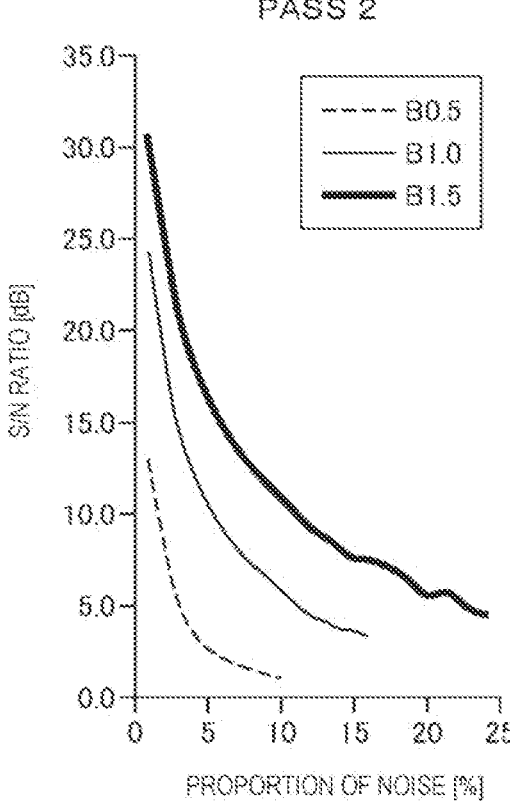

FIG. 4 is a graph showing a relationship between a proportion of noise mixed in the modulation signal and the S/N ratio of the two signals PASS1 and PASS2 generated inside the preprocessing unit 53 shown in FIG. 1. In FIG. 4, the above-described relationship is indicated by a curve for each B value of the modulation signal added to the laser light by the optical modulator 12 shown in FIG. 1.

In FIG. 4, when the B value increases from 0.5 to 1.5, the S/N ratio of the two signals PASS1 and PASS2 tends to increase regardless of the proportion of noise. Accordingly, as the B value increases, the S/N ratio of the two signals PASS1 and PASS2 can be increased. Therefore, in the embodiment, as described above, the detour optical path 7 is provided in the interference optical system 50, and the first diffraction grating 331 and the second diffraction grating 341 provided in the vibrator 30 are irradiated with the laser light. That is, in the interference optical system 50, the vibrator 30 is irradiated with the laser light twice.

As described above, the phase shift amount $\Phi_m$ is represented by $\Phi_m = B \sin(2\pi \cdot f_m \cdot t)$. Therefore, the phase deviation (B value) of the modulation signal is proportional to the phase shift amount of the laser light. Therefore, when the phase shift amount can be doubled, the B value can be doubled.

In the embodiment, the phase modulation is performed twice on the laser light, and the number of times may be three or more. The B value can be theoretically multiplied by n as long as the number of times of the phase modulation on the laser light can be set to n times, in which n is an integer of 2 or more.

1.2.3. Influence of Time Lag on B Value in a Plurality of Times of Phase Modulation In the embodiment, as described above, a plurality of times (n times) of the phase modulation is performed. As described above, since the velocity of light is fairly large, a time lag $\Delta t$ between the first phase modulation and the n-th phase modulation can be almost ignored. However, depending on the configuration of the detour optical path 7, an optical distance by which the laser light travels between the first irradiation and the n-th irradiation increases, and the time lag $\Delta t$ cannot be ignored in certain cases. Therefore, the configuration required for the laser interferometer 1 is examined based on a relationship between the time lag $\Delta t$ and an influence on the B value.

$f_M$ [Hz] is a frequency when the vibrator 30 is driven by the drive signal Sd, and Lt [m] is an optical distance by which the laser light travels during a period from a time point at which the laser light is modulated once to a time point at which the laser light is modulated n times. In this case, the detour optical path 7 preferably satisfies the following formula (1).

$$Lt \le 9 \times 10^6 / f_M \tag{1}$$

When the detour optical path 7 satisfies the above formula (1), it is possible to sufficiently reduce the influence of the time lag $\Delta t$ on the B value.

Figure 5:
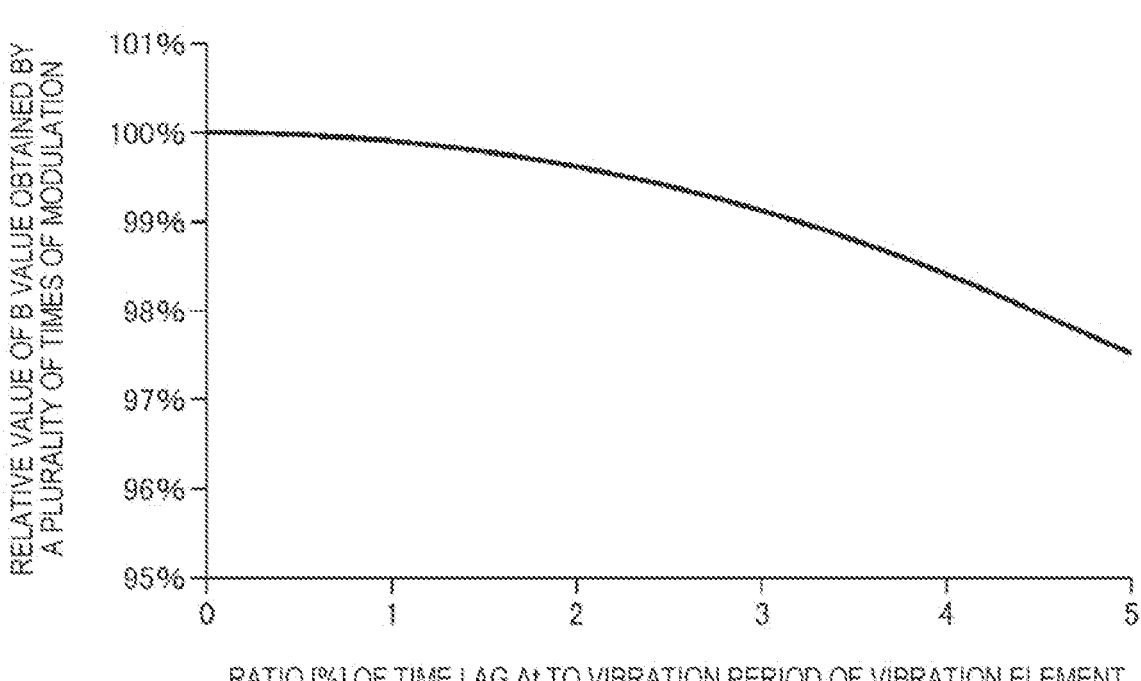
FIG. 5 is a graph showing a relationship between a ratio [%] of a time lag $\Delta t$ to a vibration period of the vibrator and a relative value of a B value obtained by a plurality of times of modulation.

FIG. 5 is a graph showing a relationship between a ratio [%] of the time lag $\Delta t$ to a vibration period of the vibrator 30 and a relative value of the B value obtained by the plurality of times of modulation. In the following description, the ratio of the time lag $\Delta t$ to the vibration period of the vibrator 30 is also referred to as a "normalized time lag". The relative value of the B value is a relative value of each B value when the time lag $\Delta t$ is zero and the B value is 100%.

As shown in FIG. 5, when the normalized time lag increases, the relative value of the B value tends to decrease, but in a range in which the normalized time lag is sufficiently small, a decrease amount of the relative value of the B value is relatively small. For example, when the normalized time lag can be reduced to 3% or less, the relative value of the B value of 99% or more can be secured with respect to the B value when the normalized time lag is 0%.

The optical distance Lt [m] is represented by $Lt = c \cdot \Delta t$, in which c is the velocity of light. When $c = 3 \times 10^8$ [m/s] and $\Delta t = 0.03 \cdot T$ are substituted into this formula, $Lt = 9 \times 10^6$ T, in which T is the vibration period of the vibrator 30 and is $1/f_M$. Therefore, as a condition for securing the relative value of the B value of 99% or more, $Lt \le 9 \times 10^6 / f_M$ is derived.

On the other hand, when the number of times of the phase modulation increases, the optical distance Lt is longer, and the time lag $\Delta t$ is larger. In the n-th irradiation, a delay of vibration of a diffraction grating irradiated with the laser light with respect to vibration of a diffraction grating located on the opposite side may be reduced to ¼ or less of the vibration period. By satisfying the conditions, it is possible to increase the probability of shifting the phase in a direction in which the relative value of the B value is increased in all irradiation from the first irradiation to the n-th irradiation. In contrast, for example, when the optical distance Lt is longer and the delay is more than ¼ of the vibration period, a part of the irradiation may cause the phase to be shifted in a direction in which the relative value of the B value is decreased.

From the above description, the detour optical path 7 preferably satisfies the following formula (2).

$$n \le c / (4 L f_M) \tag{2}$$

When the number of times n, which is set in the detour optical path 7, of irradiating the vibrator 30 with the laser light satisfies the above formula (2), it is possible to avoid the problem caused by the excessively large number of times n, that is, the problem that the effect of increasing the B value corresponding to the number of times n is not achieved. In other words, since the number of times n satisfies the above formula (2), it is possible to contribute to an increase in the B value in each irradiation, and thus it is possible to increase the B value more reliably. As a result, the S/N ratio of the preprocessed signal output by the preprocessing unit 53 can be more reliably increased.

In the above formula (2), L is an optical distance [m] by which the laser light travels from a time point at which the laser light is modulated n−1 times to a time point at which the laser light is modulated n times. For example, in the case of the detour optical path 7 shown in FIG. 2, since n=2, during a period from a time point at which the laser light L1 is modulated by the first vibration portion 31 of the vibrator 30 to a point at which the laser light L21 is modulated by the second vibration portion 32 of the vibrator 30, a product of a physical distance by which the laser light travels and a refractive index of a medium through which the laser light L21 passes may be set as an optical distance L.

As an example, when the optical distance L is 0.1 m and the frequency $f_M$ when the vibrator 30 is driven by the drive signal Sd is 100 MHz, the number of times n of irradiating the vibrator 30 with the laser light preferably satisfies n≤75.

2. First Modification of First Embodiment

Next, a laser interferometer according to a first modification of the first embodiment will be described.

Figure 6:
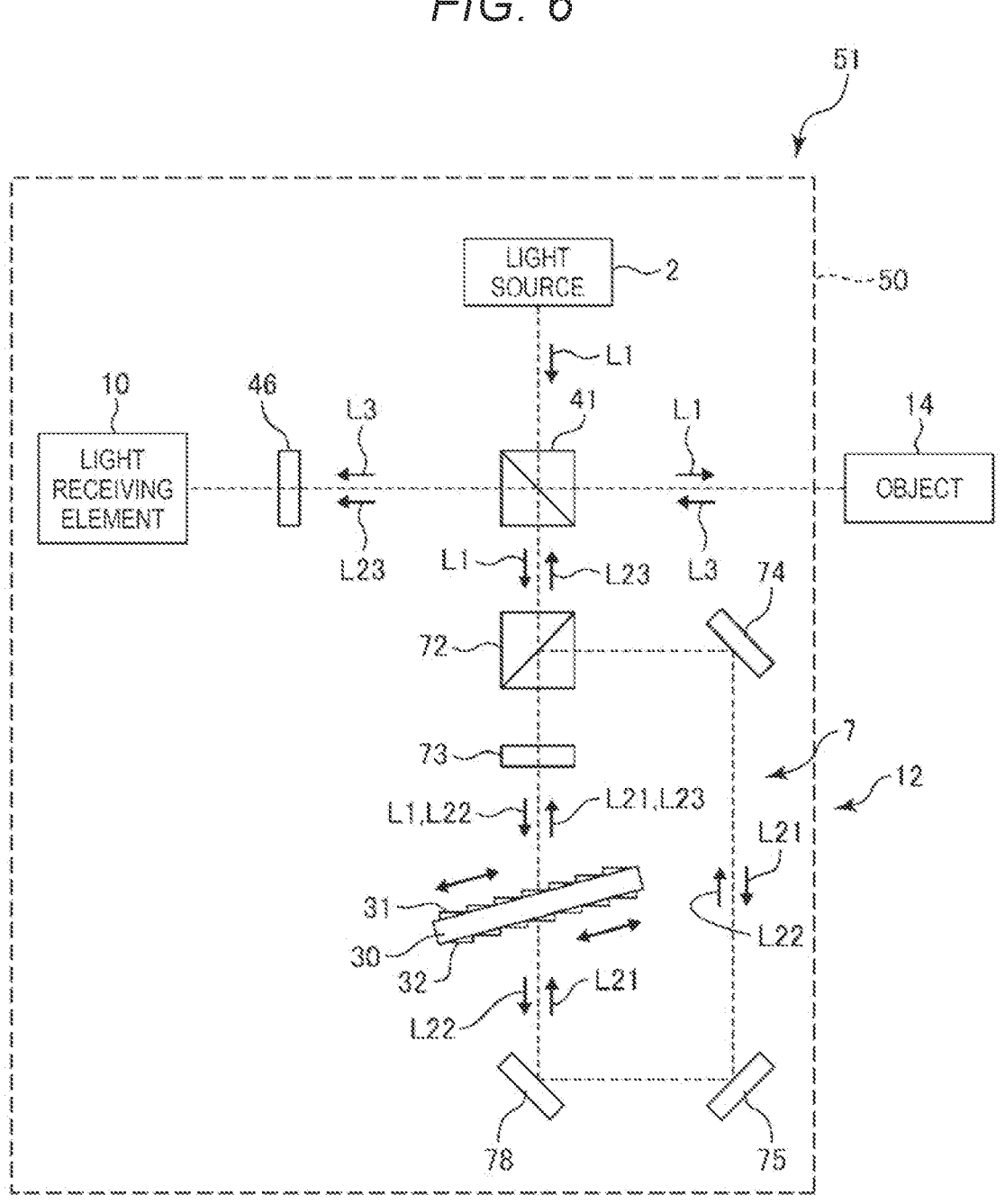
FIG. 6 is a schematic configuration diagram showing a sensor head unit provided in a laser interferometer according to a first modification of the first embodiment.

FIG. 6 is a schematic configuration diagram showing the sensor head unit 51 provided in the laser interferometer 1 according to the first modification of the first embodiment.

Hereinafter, the first modification of the first embodiment will be described, and in the following description, differences from the first embodiment will be mainly described, and description of similar matters will be omitted. In FIG. 6, the same components as those of the first embodiment are denoted by the same reference numerals.

The first modification is the same as the first embodiment except that the vibrator 30 is irradiated with the laser light three times.

The interference optical system 50 shown in FIG. 6 includes the light source 2, the beam splitter 41, the optical modulator 12, a polarizer 46, and the light receiving element 10.

One of the two laser lights L1 split by the beam splitter 41 enters the detour optical path 7 provided in the optical modulator 12 shown in FIG. 6. In the detour optical path 7 shown in FIG. 6, the vibrator 30 is irradiated with the laser light L1 three times. The other laser light L1 enters the object 14, and then enters the light receiving element 10 as the laser light L3.

The beam splitter 41 is a non-polarization beam splitter, and splits the laser light at a predetermined split ratio regardless of polarized light. In the configuration of FIG. 6, it is desirable that the laser light L1 entering the beam splitter 41 is P-polarized light.

The detour optical path 7 shown in FIG. 6 includes the beam splitter 72, the quarter-wave plate 73, the mirror 74, the mirror 75, and a mirror 78.

The laser light L1 entering the detour optical path 7 passes through the beam splitter 72 and enters, via the quarter-wave plate 73, the first vibration portion 31 provided in the vibrator 30. Accordingly, a modulation signal is added to the laser light L1, and the laser light L21 is generated. The generated laser light L21 returns to the beam splitter 72 again via the quarter-wave plate 73. The laser light L21 enters, via the mirrors 74, 75, and 78, the second vibration portion 32 provided in the vibrator 30. Accordingly, a modulation signal is added to the laser light L21, and the laser light L22 is generated. The generated laser light L22 returns to the beam splitter 72 again via the mirrors 78, 75, and 74. The laser light L22 enters the first vibration portion 31 again via the quarter-wave plate 73. Accordingly, a modulation signal is added to the laser light L22, and a laser light L23 is generated. The laser light L23 returns to the beam splitter 72 via the quarter-wave plate 73, and further enters the light receiving element 10 via the beam splitter 41 and the polarizer 46.

As described above, in the detour optical path 7 shown in FIG. 6, the vibrator 30 can be irradiated with the laser light three times. Accordingly, a phase of the laser light can be shifted in the same direction in the three times of irradiation. As a result, a phase shift amount of the laser light can be tripled, and the B value can be tripled.

In the first modification as described above, the same effects as those of the first embodiment can also be obtained.

3. Second Modification of First Embodiment

Next, a laser interferometer according to a second modification of the first embodiment will be described.

Figure 7:
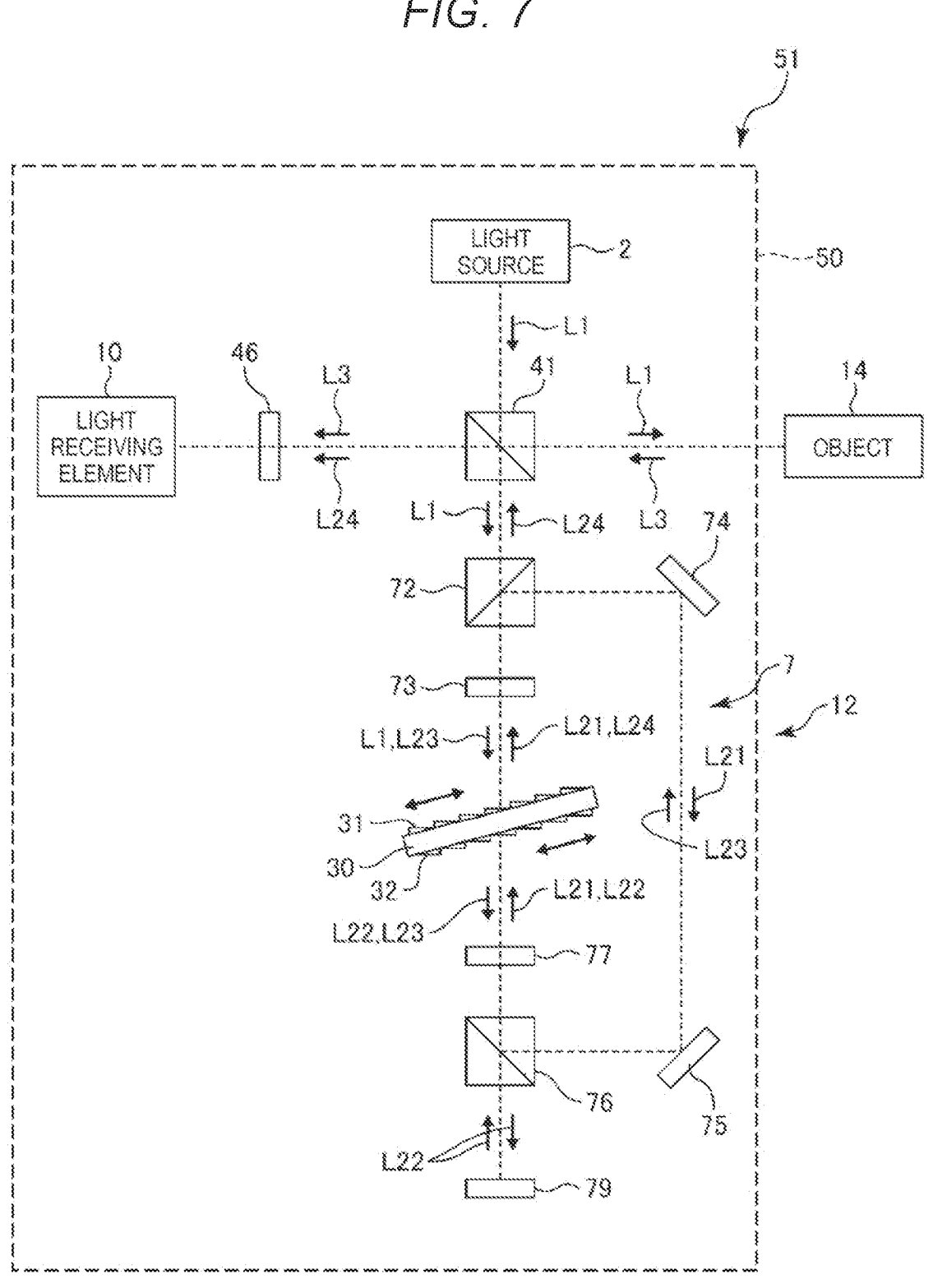
FIG. 7 is a schematic configuration diagram showing a sensor head unit provided in a laser interferometer according to a second modification of the first embodiment.

FIG. 7 is a schematic configuration diagram showing the sensor head unit 51 provided in the laser interferometer 1 according to the second modification of the first embodiment.

Hereinafter, the second modification of the first embodiment will be described, and in the following description, differences from the first embodiment and the first modification will be mainly described, and description of similar matters will be omitted. In FIG. 7, the same components as those of the first embodiment and the first modification are denoted by the same reference numerals.

The second modification is the same as the first modification except that the vibrator 30 is irradiated with the laser light four times.

The interference optical system 50 shown in FIG. 7 includes the light source 2, the beam splitter 41, the optical modulator 12, the polarizer 46, and the light receiving element 10. In the configuration of FIG. 7, it is desirable that the laser light L1 entering the beam splitter 41 is P-polarized light.

One of the two laser lights L1 split by the beam splitter 41 enters the detour optical path 7 provided in the optical modulator 12 shown in FIG. 7. In the detour optical path 7 shown in FIG. 7, the vibrator 30 is irradiated with the laser light L1 four times. The other laser light L1 enters the object 14, and then enters the light receiving element 10 as the laser light L3.

The detour optical path 7 shown in FIG. 7 includes the beam splitter 72, the quarter-wave plate 73, the mirror 74, the mirror 75, the beam splitter 76, the quarter-wave plate 77, and a mirror 79.

The laser light L1 entering the detour optical path 7 passes through the beam splitter 72 and enters, via the quarter-wave plate 73, the first vibration portion 31 provided in the vibrator 30. Accordingly, a modulation signal is added to the laser light L1, and the laser light L21 is generated. The generated laser light L21 returns to the beam splitter 72 again via the quarter-wave plate 73. The laser light L21 enters the second vibration portion 32 provided in the vibrator 30 via the mirrors 74 and 75 and the beam splitter 76. Accordingly, a modulation signal is added to the laser light L21, and the laser light L22 is generated. The generated laser light L22 is reflected by the mirror 79 via the quarter-wave plate 77 and the beam splitter 76, and then enters the second vibration portion 32 again via the beam splitter 76 and the quarter-wave plate 77. Accordingly, a modulation signal is added to the laser light L22, and the laser light L23 is generated. The generated laser light L23 enters the first vibration portion 31 again via the quarter-wave plate 77, the beam splitter 76, the mirrors 75 and 74, the beam splitter 72, and the quarter-wave plate 73. Accordingly, a modulation signal is added to the laser light L23, and a laser light L24 is generated. The laser light L24 returns to the beam splitter 72 via the quarter-wave plate 73, and further enters the light receiving element 10 via the beam splitter 41 and the polarizer 46.

As described above, in the detour optical path 7 shown in FIG. 7, the vibrator 30 can be irradiated with the laser light four times. Accordingly, a phase of the laser light can be shifted in the same direction in the four times of irradiation. As a result, a phase shift amount of the laser light can be quadrupled, and the B value can be quadrupled. For example, when a B value of 1.3 is obtained by irradiating the vibrator 30 with laser light once, theoretically, a B value of 2.6 is obtained by performing irradiation twice, a B value of 3.9 is obtained by performing irradiation three times, and a B value of 5.2 is obtained by performing irradiation four times.

In the second modification as described above, the same effects as those of the first embodiment can also be obtained.

4. Second Embodiment

Next, a laser interferometer according to a second embodiment will be described.

Figure 8:
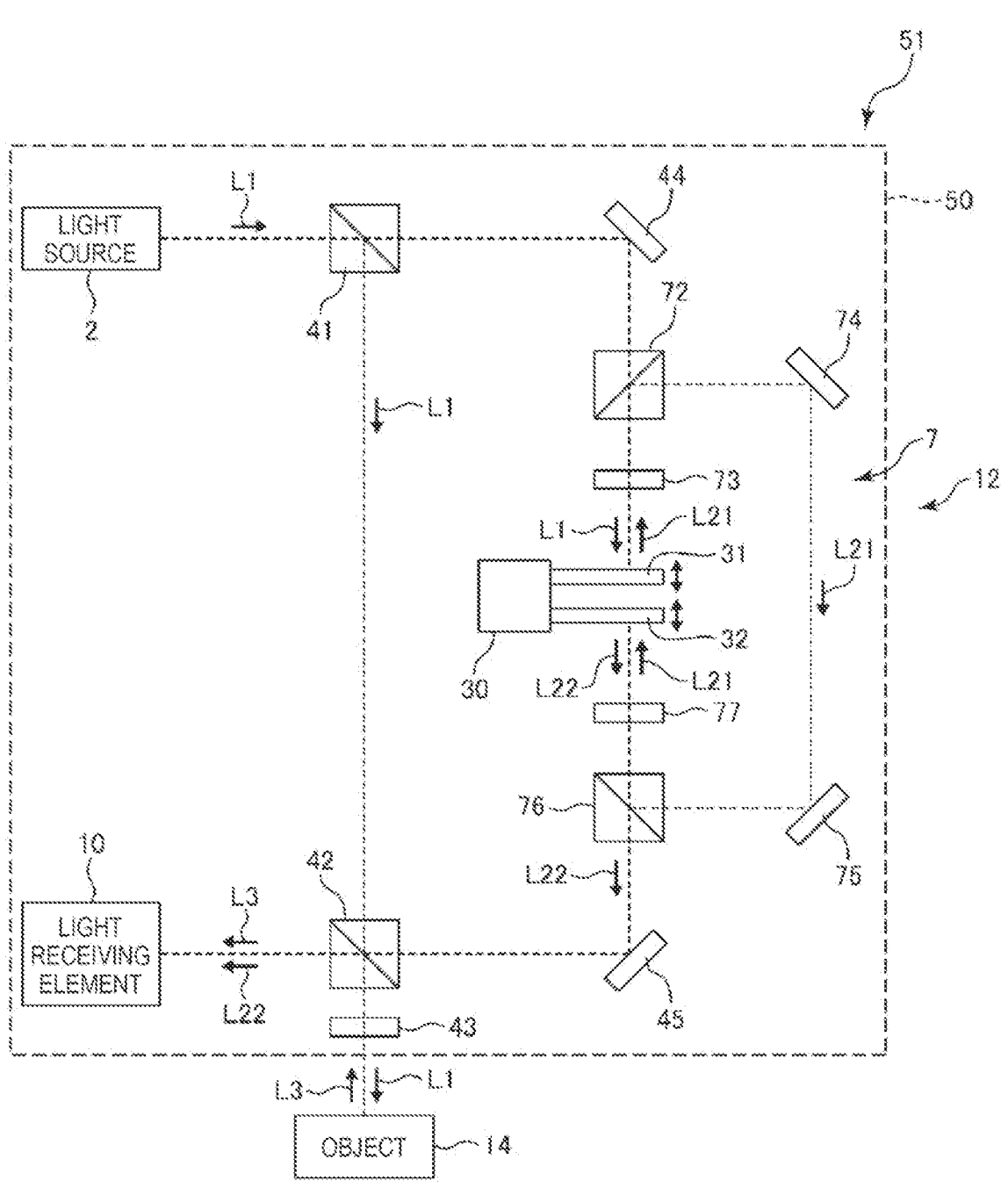
FIG. 8 is a schematic configuration diagram showing a sensor head unit provided in a laser interferometer according to a second embodiment.
Figure 9:
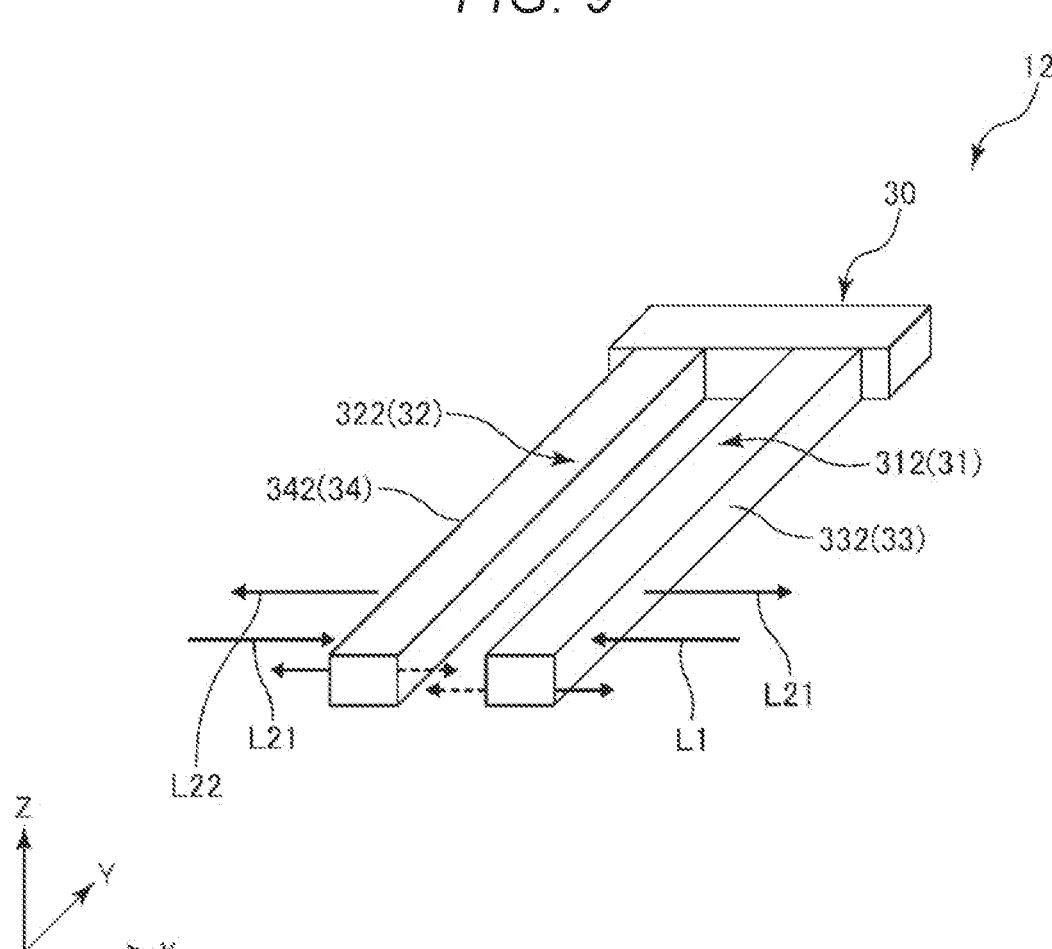
FIG. 9 is a perspective view showing a vibrator provided in an optical modulator in FIG. 8.

FIG. 8 is a schematic configuration diagram showing the sensor head unit 51 provided in the laser interferometer 1 according to the second embodiment. FIG. 9 is a perspective view showing the vibrator 30 provided in the optical modulator 12 in FIG. 8. In FIG. 9, an X axis, a Y axis, and a Z axis are set as three axes orthogonal to one another. Each axis is indicated by an arrow, a tip end side of the arrow is referred to as a "plus side" of each axis, and a base end side of the arrow is referred to as a "minus side" of each axis.

Hereinafter, the second embodiment will be described, and in the following description, differences from the first embodiment will be mainly described, and description of similar matters will be omitted. In FIGS. 8 and 9, the same components as those of the embodiment or the modification thereof are denoted by the same reference numerals.

The second embodiment is the same as the first embodiment except that the shape of the vibrator 30 is different.

As shown in FIG. 9, the vibrator 30 shown in FIG. 8 is a tuning fork type vibrator having an in-plane vibration mode in which the vibrator 30 vibrates in an X-Y plane. The vibrator 30 shown in FIG. 9 includes a first arm 312 that is the first vibration portion 31 and a second arm 322 that is the second vibration portion 32. The first arm 312 (the first vibration portion 31) and the second arm 322 (the second vibration portion 32) shown in FIG. 9 vibrate in opposite phases to each other in the X-Y plane.

A first reflective surface 332, which is the first optical modulator 33, is provided on a surface of the first arm 312, and a second reflective surface 342, which is the second optical modulator 34, is provided on a surface of the second arm 322. The first reflective surface 332 and the second reflective surface 342 are not particularly limited as long as they are surfaces that reflect the laser light. Examples thereof include a metal thin film provided on a surface intersecting with the X axis. Although not shown, the vibrator 30 includes, for example, a piezoelectric element and an electrode provided on the piezoelectric element. Among these, the electrode is made of a metal material. Therefore, surfaces of the electrode can be used as the first reflective surface 332 and the second reflective surface 342.

In FIG. 9, solid line arrows and broken line arrows indicating deformation directions of the vibrator 30 are shown. A voltage causing the deformation indicated by the solid line arrows is opposite to a voltage causing the deformation indicated by the broken line arrows. Therefore, the first arm 312 (the first vibration portion 31) and the second arm 322 (the second vibration portion 32) of the vibrator 30 shown in FIG. 9 vibrate in opposite phases to each other. As a result, when the first reflective surface 332 is irradiated with laser light and then the second reflective surface 342 is irradiated with the laser light, the phase of the laser light can be shifted in the same direction in the two times of irradiation.

In the vibrator 30 shown in FIG. 9, when the X-Y plane is an arm forming surface, the first arm 312 and the second arm 322 are arranged in a plane of the arm forming surface. The in-plane vibration mode described above is a vibration mode in which the deformation in which the first arm 312 and the second arm 322 are separated from each other as indicated by the solid line arrows in FIG. 9 and the deformation in which the first arm 312 and the second arm 322 approach each other as indicated by the broken line arrows in FIG. 9 are repeated in the plane of the arm forming surface. In other words, the in-plane vibration mode is a vibration mode in which deformation in which the first arm 312 is displaced to the minus side of the X axis and the second arm 322 is displaced to the plus side of the X axis and deformation in which the first arm 312 is displaced to the plus side of the X axis and the second arm 322 is displaced to the minus side of the X axis are repeated.

Since the in-plane vibration mode is accompanied by flexural vibration of the first arm 312 and the second arm 322, an amplitude of the first reflective surface 332 and the second reflective surface 342 can be easily secured to be larger than that in the thickness-shear vibration mode. Therefore, as an example, a large B value of 17.7 is obtained by irradiating the vibrator 30 with the laser light once only. In this case, theoretically, a B value of 35.4 is obtained by performing irradiation twice, a B value of 53.1 is obtained by performing irradiation three times, and a B value of 70.8 is obtained by performing irradiation four times.

When it is desired to control the B value to be a target value, the B value can also be reduced. For example, for the vibrator 30, the B value can be reduced by using a vibration mode in which the vibrator 30 vibrates at a high order.

The vibrator 30 oscillates based on the drive signal Sd output from the signal generator 6. Power (drive power) required for the oscillation of the vibrator 30 is not particularly limited, and is as small as about 0.1 μW to 100 mW. Therefore, by providing the vibrator 30, it is possible to reduce the size, weight, and power consumption of the laser interferometer 1. Since it is not necessary to provide a diffraction grating and the like in the tuning fork type vibrator and the surfaces of the electrode can be used as the first optical modulator 33 and the second optical modulator 34, it is also useful in that the structure is easily simplified.

A length of the vibrator 30 in a Y axis direction is, for example, about 0.2 mm or more and 5.0 mm or less. A thickness of the vibrator 30 in a Z axis direction is, for example, about 0.003 mm or more and 0.5 mm or less.

A shape of the tuning fork type vibrator is not limited to a two-legged tuning fork type as shown in FIG. 9. Examples thereof include a cantilever beam shape of a three-legged tuning fork type and a four-legged tuning fork type.

Examples of the vibrator 30 shown in FIG. 8 include a quartz crystal vibrator, a silicon vibrator, and a ceramic vibrator.

The quartz crystal vibrator includes a quartz crystal element which is a piezoelectric element and an electrode provided on the quartz crystal element. In such a quartz crystal vibrator, a modulation signal having a high S/N ratio can be added to the laser light L1 by using a fairly high Q value of the quartz crystal. As the quartz crystal element, a quartz crystal element cut out from a quartz crystal substrate such as a Z-cut quartz crystal flat plate is used. An oscillation frequency of the quartz crystal vibrator is, for example, preferably about 1 kHz or more and 100 kHz or less, and more preferably about 10 kHz or more and 100 kHz or less.

A thickness of the quartz crystal element is preferably 100 μm or more and 300 μm or less. With such a thickness, even when side surfaces of the quartz crystal element, that is, electrode surfaces formed at cut surfaces when cut out from the quartz crystal substrate are the first reflective surface 332 and the second reflective surface 342, a sufficient area can be secured.

The silicon vibrator is a vibrator that includes a single crystal silicon piece manufactured from a single crystal silicon substrate by a micro electromechanical system (MEMS) technique, a piezoelectric film, and an electrode. The MEMS refers to a micro electromechanical system. Examples of a shape of the single crystal silicon piece include a cantilever beam shape of a two-legged tuning fork type and a three-legged tuning fork type, and a both-ends-supported beam shape. An oscillation frequency of the silicon vibrator is, for example, about 1 kHz to several hundreds of MHz.

The ceramic vibrator is a vibrator including an electrode and a piezoelectric ceramic piece manufactured by sintering a piezoelectric ceramic. Examples of the piezoelectric ceramic include lead zirconate titanate (PZT) and barium titanate (BTO). An oscillation frequency of the ceramic vibrator is, for example, about hundreds of kHz to tens of MHz.

In the second embodiment as described above, the same effects as those of the first embodiment can also be obtained.

5. First Modification of Second Embodiment

Next, a laser interferometer according to a first modification of the second embodiment will be described.

Figure 10:
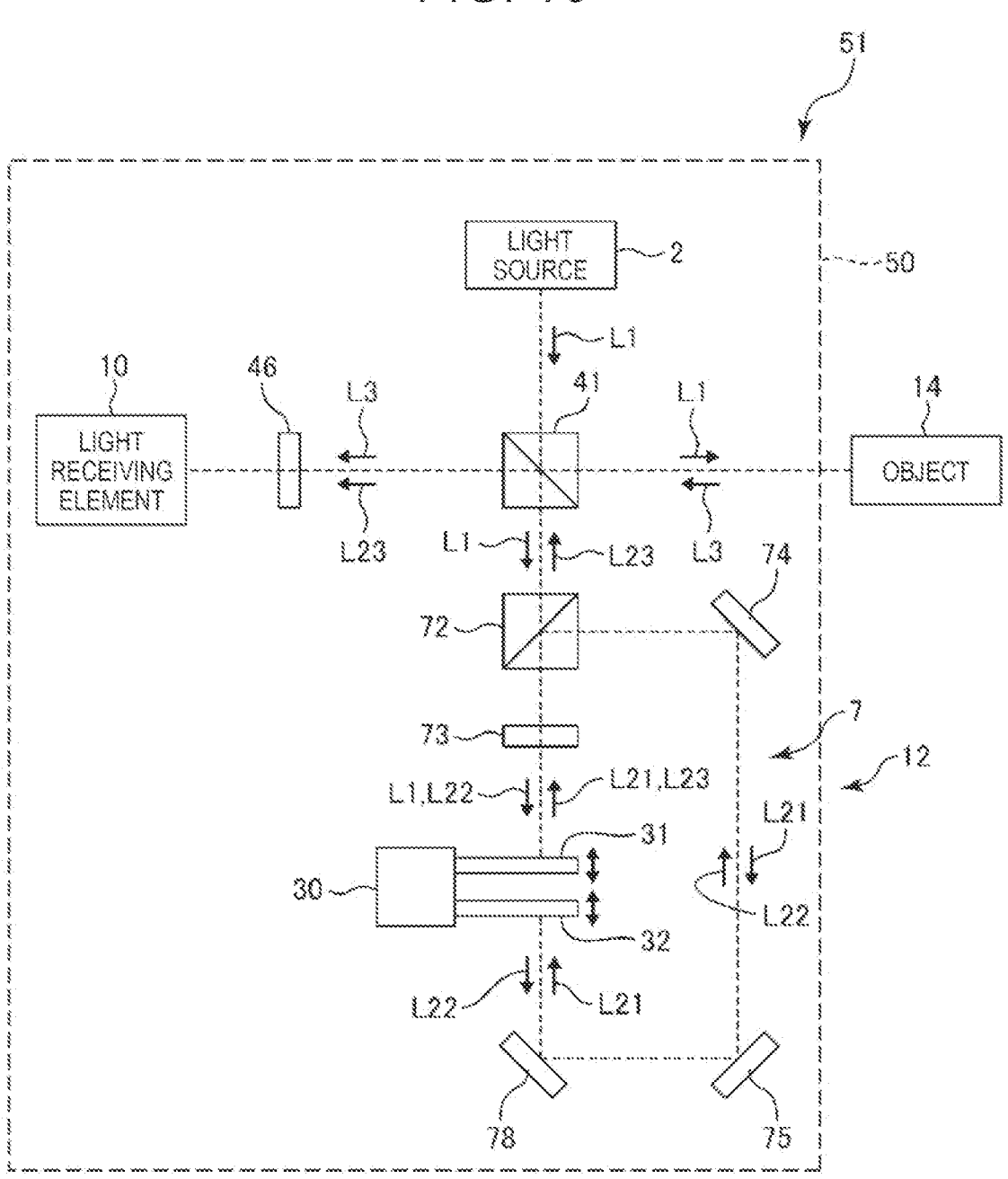
FIG. 10 is a schematic configuration diagram showing a sensor head unit provided in a laser interferometer according to a first modification of the second embodiment.

FIG. 10 is a schematic configuration diagram showing the sensor head unit 51 provided in the laser interferometer 1 according to the first modification of the second embodiment.

Hereinafter, the first modification of the second embodiment will be described, and in the following description, differences from the first embodiment or the modification thereof and the second embodiment will be mainly described, and description of similar matters will be omitted. In FIG. 10, the same components as those of the first embodiment or the modification thereof and the second embodiment are denoted by the same reference numerals.

The first modification is the same as the second embodiment except that the vibrator 30 is irradiated with the laser light three times.

The interference optical system 50 shown in FIG. 10 includes the light source 2, the beam splitter 41, the optical modulator 12, the polarizer 46, and the light receiving element 10. In the configuration of FIG. 10, it is desirable that the laser light L1 entering the beam splitter 41 is P-polarized light.

One of the two laser lights L1 split by the beam splitter 41 enters the detour optical path 7 provided in the optical modulator 12 shown in FIG. 10. In the detour optical path 7 shown in FIG. 10, the vibrator 30 is irradiated with the laser light L1 three times. The other laser light L1 enters the object 14, and then enters the light receiving element 10 as the laser light L3.

The beam splitter 41 is a non-polarization beam splitter, and splits the laser light at a predetermined split ration regardless of polarized light.

The detour optical path 7 shown in FIG. 10 includes the beam splitter 72, the quarter-wave plate 73, the mirror 74, the mirror 75, and the mirror 78.

The laser light L1 entering the detour optical path 7 passes through the beam splitter 72 and enters, via the quarter-wave plate 73, the first vibration portion 31 provided in the vibrator 30. Accordingly, a modulation signal is added to the laser light L1, and the laser light L21 is generated. The generated laser light L21 returns to the beam splitter 72 again via the quarter-wave plate 73. The laser light L21 enters, via the mirrors 74, 75, and 78, the second vibration portion 32 provided in the vibrator 30. Accordingly, a modulation signal is added to the laser light L21, and the laser light L22 is generated. The generated laser light L22 returns to the beam splitter 72 again via the mirrors 78, 75, and 74. The laser light L22 enters the first vibration portion 31 again via the quarter-wave plate 73. Accordingly, a modulation signal is added to the laser light L22, and the laser light L23 is generated. The laser light L23 returns to the beam splitter 72 via the quarter-wave plate 73, and further enters the light receiving element 10 via the beam splitter 41 and the polarizer 46.

As described above, in the detour optical path 7 shown in FIG. 10, the vibrator 30 can be irradiated with the laser light three times. Accordingly, a phase of the laser light can be shifted in the same direction in the three times of irradiation. As a result, a phase shift amount of the laser light can be tripled, and the B value can be tripled.

In the first modification as described above, the same effects as those of the second embodiment can also be obtained.

6. Second Modification of Second Embodiment

Next, a laser interferometer according to a second modification of the second embodiment will be described.

Figure 11:
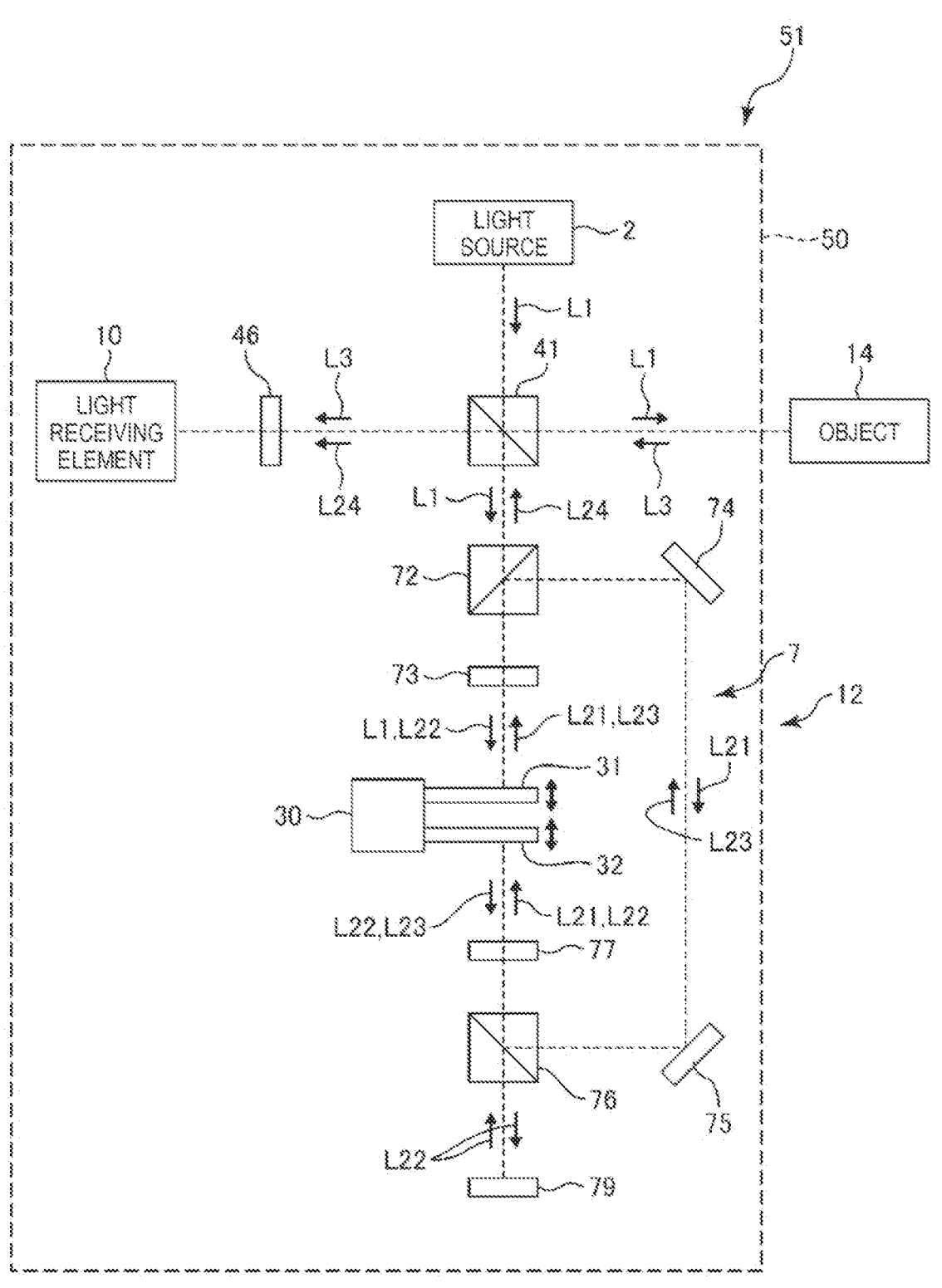
FIG. 11 is a schematic configuration diagram showing a sensor head unit provided in a laser interferometer according to a second modification of the second embodiment.

FIG. 11 is a schematic configuration diagram showing the sensor head unit 51 provided in the laser interferometer 1 according to the second modification of the second embodiment.

Hereinafter, the second modification of the second embodiment will be described, and in the following description, differences from the first embodiment or the modification thereof and the second embodiment will be mainly described, and description of similar matters will be omitted. In FIG. 11, the same components as those of the first embodiment or the modification thereof and the second embodiment are denoted by the same reference numerals.

The second modification is the same as the first modification except that the vibrator 30 is irradiated with the laser light four times.

The interference optical system 50 shown in FIG. 11 includes the light source 2, the beam splitter 41, the optical modulator 12, the polarizer 46, and the light receiving element 10. In the configuration of FIG. 11, it is desirable that the laser light L1 entering the beam splitter 41 is P-polarized light.

One of the two laser lights L1 split by the beam splitter 41 enters the detour optical path 7 provided in the optical modulator 12 shown in FIG. 11. In the detour optical path 7 shown in FIG. 11, the vibrator 30 is irradiated with the laser light L1 four times. The other laser light L1 enters the object 14, and then enters the light receiving element 10 as the laser light L3.

The detour optical path 7 shown in FIG. 11 includes the beam splitter 72, the quarter-wave plate 73, the mirror 74, the mirror 75, the beam splitter 76, the quarter-wave plate 77, and the mirror 79.

The laser light L1 entering the detour optical path 7 passes through the beam splitter 72 and enters, via the quarter-wave plate 73, the first vibration portion 31 provided in the vibrator 30. Accordingly, a modulation signal is added to the laser light L1, and the laser light L21 is generated. The generated laser light L21 returns to the beam splitter 72 again via the quarter-wave plate 73. The laser light L21 enters the second vibration portion 32 provided in the vibrator 30 via the mirrors 74 and 75 and the beam splitter 76. Accordingly, a modulation signal is added to the laser light L21, and the laser light L22 is generated. The generated laser light L22 is reflected by the mirror 79 via the quarter-wave plate 77 and the beam splitter 76, and then enters the second vibration portion 32 again via the beam splitter 76 and the quarter-wave plate 77. Accordingly, a modulation signal is added to the laser light L22, and the laser light L23 is generated. The generated laser light L23 enters the first vibration portion 31 again via the quarter-wave plate 77, the beam splitter 76, the mirrors 75 and 74, the beam splitter 72, and the quarter-wave plate 73. Accordingly, a modulation signal is added to the laser light L23, and the laser light L24 is generated. The laser light L24 returns to the beam splitter 72 via the quarter-wave plate 73, and further enters the light receiving element 10 via the beam splitter 41 and the polarizer 46.

As described above, in the detour optical path 7 shown in FIG. 11, the vibrator 30 can be irradiated with the laser light four times. Accordingly, a phase of the laser light can be shifted in the same direction in the four times of irradiation. As a result, a phase shift amount of the laser light can be quadrupled, and the B value can be quadrupled.

In the second modification as described above, the same effects as those of the second embodiment can also be obtained.

7. Third Embodiment

Next, a laser interferometer according to a third embodiment will be described.

Figure 12:
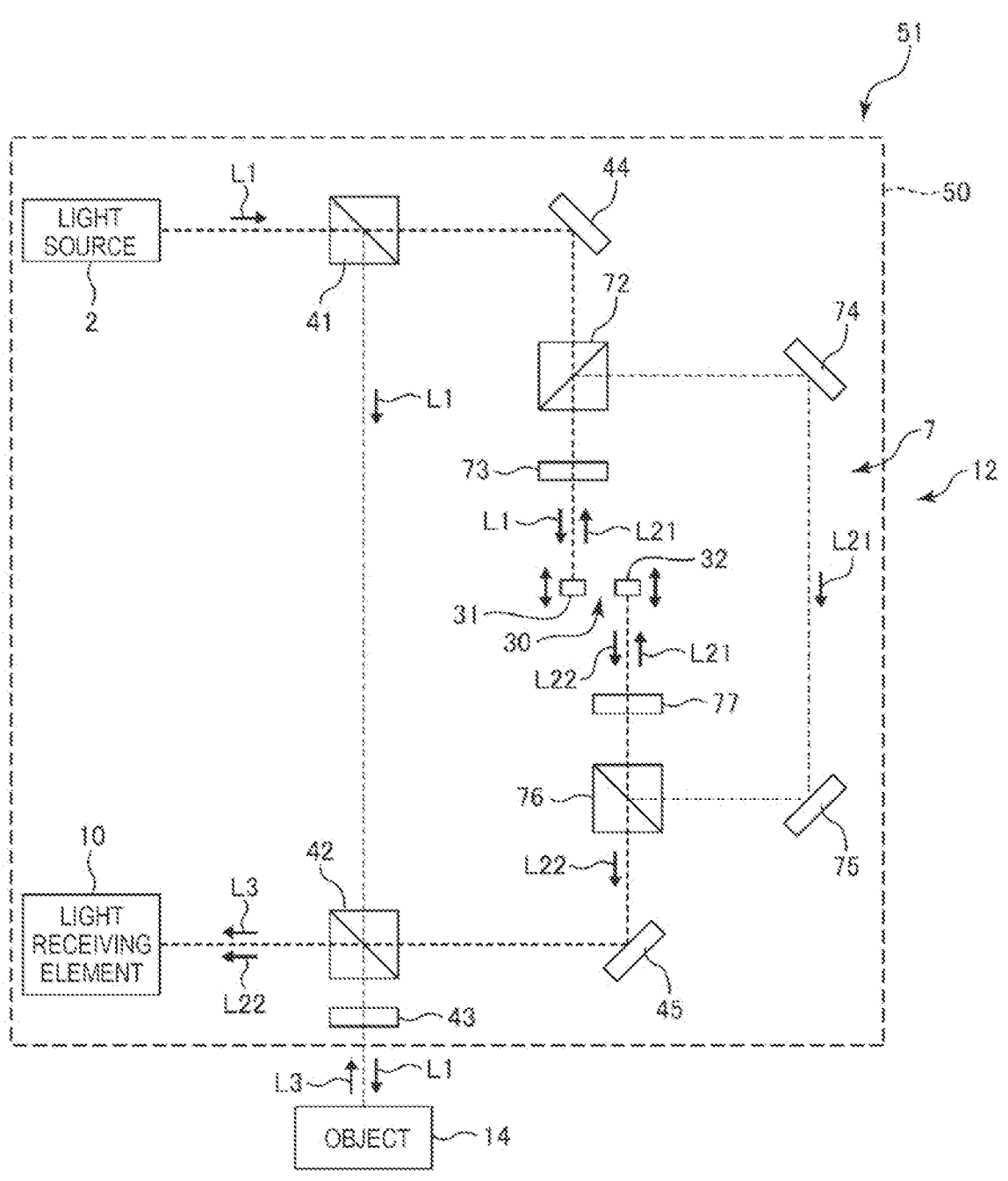
FIG. 12 is a schematic configuration diagram showing a sensor head unit provided in a laser interferometer according to a third embodiment.
Figure 13:
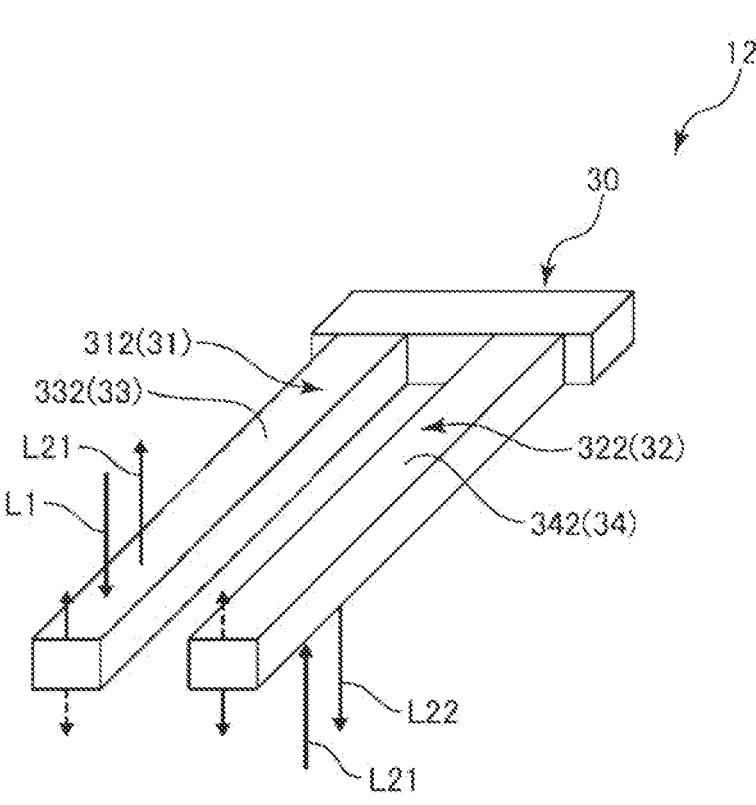
FIG. 13 is a perspective view showing a vibrator provided in an optical modulator in FIG. 12.
Figure 13:
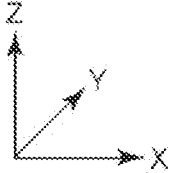

FIG. 12 is a schematic configuration diagram showing the sensor head unit 51 provided in the laser interferometer 1 according to the third embodiment. FIG. 13 is a perspective view showing the vibrator 30 provided in the optical modulator 12 in FIG. 12. In FIG. 13, an X axis, a Y axis, and a Z axis are set as three axes orthogonal to one another. Each axis is indicated by an arrow, a tip end side of the arrow is referred to as a "plus side" of each axis, and a base end side of the arrow is referred to as a "minus side" of each axis.

Hereinafter, the third embodiment will be described, and in the following description, differences from the second embodiment will be mainly described, and description of similar matters will be omitted. In FIGS. 12 and 13, the same components as those of the embodiment or the modification thereof are denoted by the same reference numerals.

The third embodiment is the same as the second embodiment except that the vibration mode of the vibrator 30 is different.

The vibrator 30 shown in FIG. 12 is a tuning fork type vibrator having, in addition to the in-plane vibration mode described above, an out-of-plane vibration mode in which the vibrator 30 vibrates in the Z axis direction as shown in FIG. 13. The vibrator 30 shown in FIG. 13 includes the first arm 312 that is the first vibration portion 31 and the second arm 322 that is the second vibration portion 32. Among these, in the out-of-plane vibration mode, the first arm 312 (the first vibration portion 31) and the second arm 322 (the second vibration portion 32) shown in FIG. 13 vibrate in opposite phases to each other along the Z axis. Specifically, the out-of-plane vibration mode is a vibration mode in which deformation in which the first arm 312 is displaced to the plus side of the Z axis and the second arm 322 is displaced to the minus side of the Z axis as indicated by the solid line arrows in FIG. 13 and deformation in which the first arm 312 is displaced to the minus side of the Z axis and the second arm 322 is displaced to the plus side of the Z axis as indicated by the broken line arrows in FIG. 13 are repeated.

The first reflective surface 332, which is the first optical modulator 33, is provided on the surface of the first arm 312, and the second reflective surface 342, which is the second optical modulator 34, is provided on the surface of the second arm 322. The first reflective surface 332 and the second reflective surface 342 are not particularly limited as long as they are surfaces that reflect the laser light. Examples thereof include a metal thin film provided on a surface intersecting with the Z axis. Although not shown, the vibrator 30 includes, for example, a piezoelectric element and an electrode provided on the piezoelectric element. Among these, the electrode is made of a metal material. Therefore, surfaces of the electrode can be used as the first reflective surface 332 and the second reflective surface 342. A space for providing the metal thin film and the like is easily secured on the surface intersecting with the Z axis as compared with the surface intersecting with the X axis. Therefore, the first reflective surface 332 and the second reflective surface 342 shown in FIG. 13 have high tolerance to deviation of an irradiation position of the laser light. Accordingly, the laser interferometer 1 according to the third embodiment has an advantage of being excellent in manufacturability of the interference optical system 50.

In the vibrator 30, when the in-plane vibration mode is set to be a main vibration mode, the out-of-plane vibration mode is treated as a subsidiary vibration mode. In a normal application, the main vibration mode is used as, for example, an oscillation mode for a clock source, and the subsidiary vibration mode is avoided as spurious or is suppressed and is not used.

In contrast, in the embodiment, the out-of-plane vibration mode is actively excited without being suppressed. Accordingly, displacement amounts of the first reflective surface 332 and the second reflective surface 342 in a traveling direction of the laser light can be sufficiently secured, and the B value can be easily increased.

Figure 14:
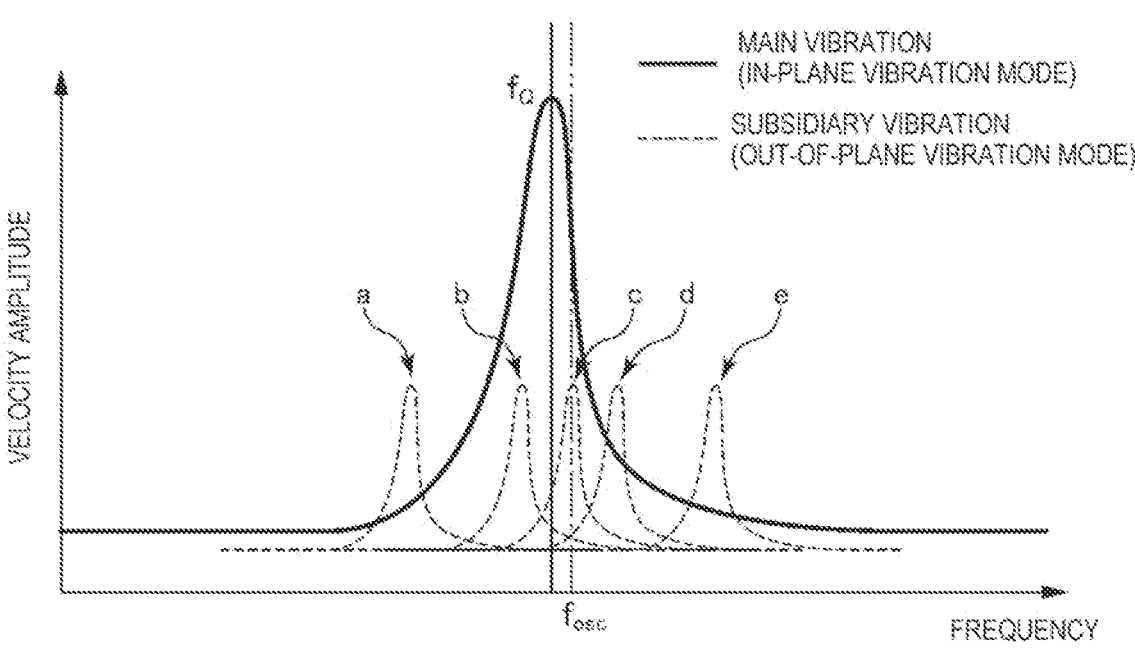
FIG. 14 is a schematic diagram showing a frequency characteristic of a main vibration mode (in-plane vibration mode) and frequency characteristics of subsidiary vibration modes (out-of-plane vibration modes).

FIG. 14 is a schematic diagram showing a frequency characteristic of a main vibration mode (in-plane vibration mode) and frequency characteristics of subsidiary vibration modes (out-of-plane vibration modes). In FIG. 14, a horizontal axis indicates a frequency of vibration, and a vertical axis indicates a velocity amplitude of the vibration. In the present specification, a characteristic represented by a curve indicating frequency dependence of the velocity amplitude of the vibration shown in FIG. 14 is referred to as a "frequency characteristic" of each vibration mode.

The main vibration mode is excited by the drive signal Sd output from the signal generator 6. A frequency when the vibrator 30 is excited by the signal generator 6 is set at an oscillation frequency $f_{osc}$. A natural frequency of the main vibration mode of a single vibrator 30 is set at $f_Q$. On the other hand, natural frequencies of a plurality of subsidiary vibration modes present in the single vibrator 30 are set at a, b, c, d, and e.

The oscillation frequency $f_{osc}$ of the signal generator 6 is a value corresponding to the natural frequency $f_Q$ of the vibrator 30. In the example in FIG. 14, a frequency slightly larger than the natural frequency $f_Q$ is the oscillation frequency $f_{osc}$. The frequency characteristic of the main vibration mode is represented by a curve having a peak at the natural frequency $f_Q$ and decreasing toward both sides.

On the other hand, in the example in FIG. 14, there are five types of subsidiary vibration modes, and the natural frequencies a, b, c, d, and e are distributed on both sides of the natural frequency $f_Q$. The frequency characteristics of the subsidiary vibration modes are represented by curves having peaks at the respective natural frequencies a, b, c, d, and e and decreasing toward both sides.

Among the frequency characteristics of the subsidiary vibration modes, the frequency characteristics having peaks at the natural frequencies b, c, and d each have a part of its curve overlapping the oscillation frequency $f_{osc}$. In this case, the subsidiary vibration modes of the natural frequencies b, c, and d are coupled to the main vibration mode in terms of energy and are excited. Therefore, when the oscillation frequency $f_{osc}$ of the signal generator 6 is set such that the main vibration mode is excited, these subsidiary vibration modes can also be excited. On the other hand, in the frequency characteristics having peaks at the natural frequencies a and e, the curves thereof do not overlap the oscillation frequency $f_{osc}$. Therefore, these subsidiary vibration modes are not excited since these subsidiary vibration modes are not coupled to the main vibration mode.

In the subsidiary vibration modes, frequency instability tends to occur due to temperature characteristics as compared with the main vibration mode. Therefore, in a normal application, the natural frequencies of the subsidiary vibration modes are required to be separated from the main vibration mode.

However, when the vibrator 30 is a signal source for outputting the reference signal Ss, the demodulation processing is performed in real time by the calculator 52 based on the reference signal Ss including the fluctuation of the frequency. Therefore, even when the fluctuation of the frequency is included in the reference signal Ss, the fluctuation can be offset or reduced in the demodulation processing. Therefore, there is an advantage that restriction on the natural frequencies of the subsidiary vibration modes is reduced, and design and manufacture of the vibrator 30 are facilitated.

The natural frequencies of the subsidiary vibration modes can be adjusted by the structure of the vibrator 30, such as a length of the first arm 312 and the second arm 322 in the Y axis direction, a thickness thereof in the Z axis direction, the shape of the vibrator 30 such as a cross-sectional shape in an X-Z plane, and arrangement of the electrode (not shown). That is, the structure of the vibrator 30 may be adjusted so as to implement the natural frequencies close to the natural frequency $f_Q$ of the main vibration mode. A specific structure can be found by performing an experiment or simulation. As an example, when a cross-sectional shape of the first arm 312 and the second arm 322 is not a rectangle but a parallelogram, the subsidiary vibration modes are easily excited. By changing the shape of the parallelogram, the natural frequencies of the subsidiary vibration modes can be adjusted.

In the out-of-plane vibration modes, the amplitude of the first reflective surface 332 and the second reflective surface 342 is easily secured to be larger than that in the thickness-shear vibration mode. Therefore, as an example, a large B value of 2.6 is obtained by irradiating the vibrator 30 with the laser light once only. In this case, theoretically, a B value of 5.2 is obtained by performing irradiation twice, a B value of 7.8 is obtained by performing irradiation three times, and a B value of 10.4 is obtained by performing irradiation four times.

A shape of the tuning fork type vibrator is not limited to a two-legged tuning fork type as shown in FIG. 13. Examples thereof include a cantilever beam shape of a three-legged tuning fork type and a four-legged tuning fork type.

Examples of the vibrator 30 shown in FIG. 8 include a quartz crystal vibrator, a silicon vibrator, and a ceramic vibrator.

The natural frequencies of the out-of-plane vibration modes are often lower than that of the in-plane vibration mode. Therefore, by using the out-of-plane vibration modes, it is possible to lower a frequency of the modulation signal or the reference signal Ss. Specifically, since the natural frequencies of the out-of-plane vibration modes are often lower than, for example, 1 MHz, the frequency of the modulation signal or the reference signal Ss can also be lowered to this level. Therefore, it is possible to lower a requirement for processing performance of a processor such as an analog-to-digital converter (ADC) or a field-programmable gate array (FPGA) that processes these signals. As a result, the cost of the laser interferometer 1 can be easily reduced.

In the silicon vibrator, design of setting out-of-plane vibration as main vibration is possible. In this case, for example, a Q value can be further increased by reducing a thickness of the single crystal silicon piece having a cantilever beam shape. The out-of-plane vibration can be excited, for example, by arranging a piezoelectric film.

In the ceramic vibrator, out-of-plane vibration coupled to in-plane vibration such as length vibration and spread vibration in addition to flexural vibration can be used.

In the third embodiment as described above, the same effects as those of the first embodiment and the second embodiment can also be obtained.

8. First Modification of Third Embodiment

Next, a laser interferometer according to a first modification of the third embodiment will be described.

Figure 15:
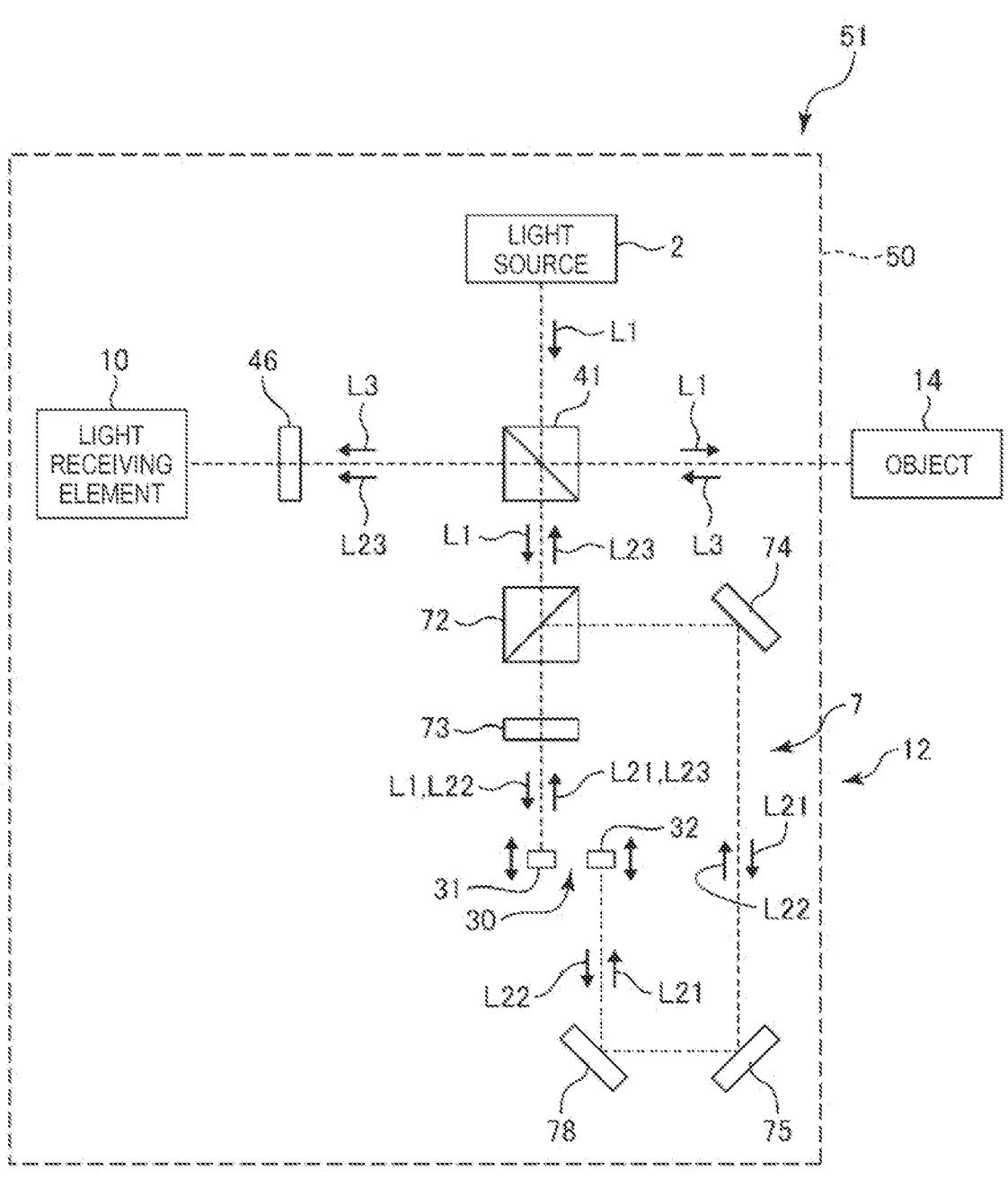
FIG. 15 is a schematic configuration diagram showing a sensor head unit provided in a laser interferometer according to a first modification of the third embodiment.

FIG. 15 is a schematic configuration diagram showing the sensor head unit 51 provided in the laser interferometer 1 according to the first modification of the third embodiment.

Hereinafter, the first modification of the third embodiment will be described, and in the following description, differences from the first and second embodiments or the modifications thereof will be mainly described, and description of similar matters will be omitted. In FIG. 15, the same components as those of the first and second embodiments or the modifications thereof are denoted by the same reference numerals.

The first modification is the same as the third embodiment except that the vibrator 30 is irradiated with the laser light three times.

The interference optical system 50 shown in FIG. 15 includes the light source 2, the beam splitter 41, the optical modulator 12, the polarizer 46, and the light receiving element 10. In the configuration of FIG. 15, it is desirable that the laser light L1 entering the beam splitter 41 is P-polarized light.

One of the two laser lights L1 split by the beam splitter 41 enters the detour optical path 7 provided in the optical modulator 12 shown in FIG. 15. In the detour optical path 7 shown in FIG. 15, the vibrator 30 is irradiated with the laser light L1 three times. The other laser light L1 enters the object 14, and then enters the light receiving element 10 as the laser light L3.

The beam splitter 41 is a non-polarization beam splitter, and splits the laser light at a predetermined split ratio regardless of polarized light.

The detour optical path 7 shown in FIG. 15 includes the beam splitter 72, the quarter-wave plate 73, the mirror 74, the mirror 75, and the mirror 78.

The laser light L1 entering the detour optical path 7 passes through the beam splitter 72 and enters, via the quarter-wave plate 73, the first vibration portion 31 provided in the vibrator 30. Accordingly, a modulation signal is added to the laser light L1, and the laser light L21 is generated. The generated laser light L21 returns to the beam splitter 72 again via the quarter-wave plate 73. The laser light L21 enters, via the mirrors 74, 75, and 78, the second vibration portion 32 provided in the vibrator 30. Accordingly, a modulation signal is added to the laser light L21, and the laser light L22 is generated. The generated laser light L22 returns to the beam splitter 72 again via the mirrors 78, 75, and 74. The laser light L22 enters the first vibration portion 31 again via the quarter-wave plate 73. Accordingly, a modulation signal is added to the laser light L22, and the laser light L23 is generated. The laser light L23 returns to the beam splitter 72 via the quarter-wave plate 73, and further enters the light receiving element 10 via the beam splitter 41 and the polarizer 46.

As described above, in the detour optical path 7 shown in FIG. 15, the vibrator 30 can be irradiated with the laser light three times. Accordingly, a phase of the laser light can be shifted in the same direction in the three times of irradiation. As a result, a phase shift amount of the laser light can be tripled, and the B value can be tripled.

In the first modification as described above, the same effects as those of the third embodiment can also be obtained.

9. Second Modification of Third Embodiment

Next, a laser interferometer according to a second modification of the third embodiment will be described.

Figure 16:
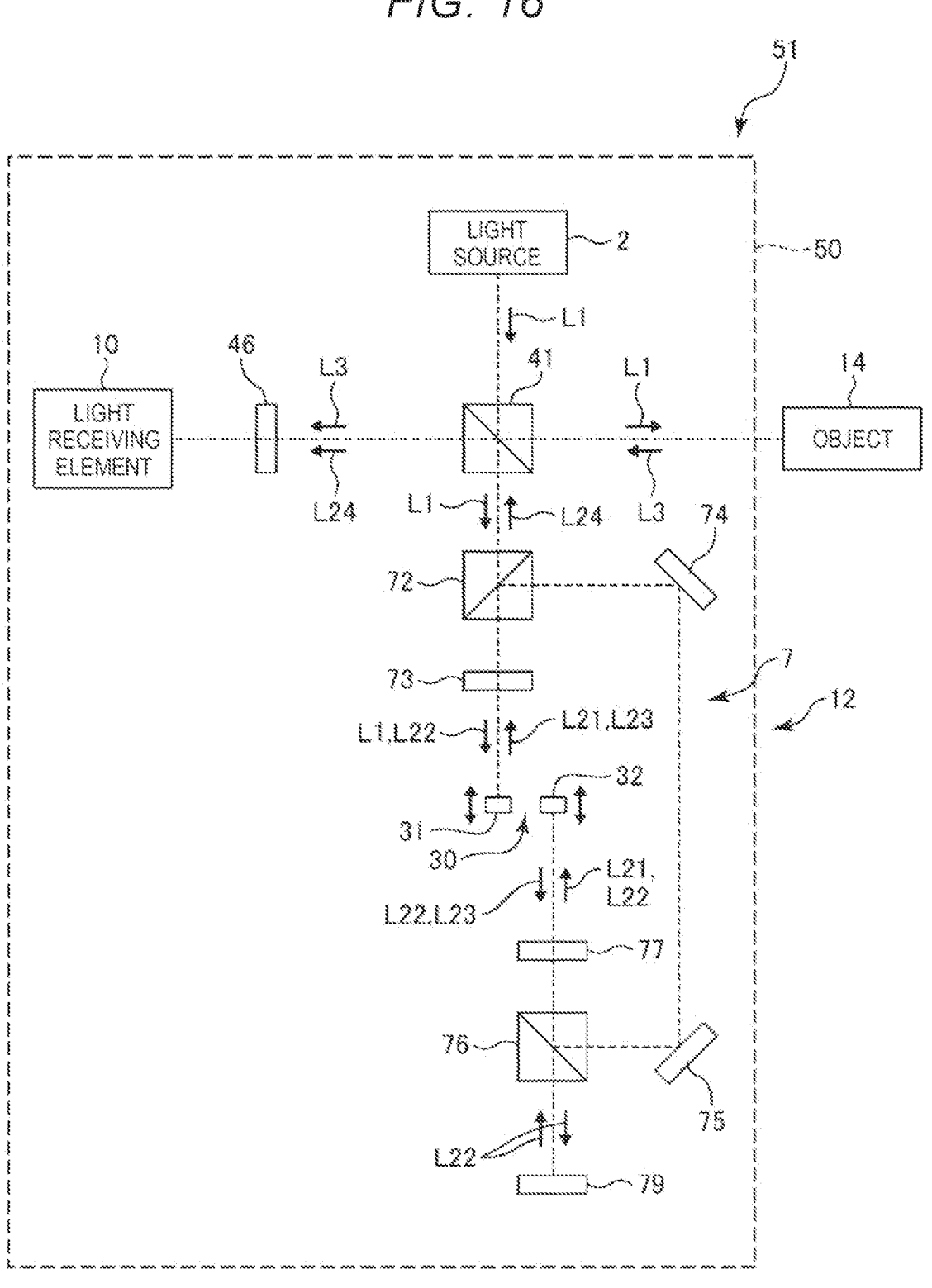
FIG. 16 is a schematic configuration diagram showing a sensor head unit provided in a laser interferometer according to a second modification of the third embodiment.

FIG. 16 is a schematic configuration diagram showing the sensor head unit 51 provided in the laser interferometer 1 according to the second modification of the third embodiment.

Hereinafter, the second modification of the third embodiment will be described, and in the following description, differences from the first and second embodiments or the modifications thereof will be mainly described, and description of similar matters will be omitted. In FIG. 16, the same components as those of the first and second embodiments or the modifications thereof are denoted by the same reference numerals.

The second modification is the same as the first modification except that the vibrator 30 is irradiated with the laser light four times.

The interference optical system 50 shown in FIG. 16 includes the light source 2, the beam splitter 41, the optical modulator 12, the polarizer 46, and the light receiving element 10 (photodetector). In the configuration of FIG. 16, it is desirable that the laser light L1 entering the beam splitter 41 is P-polarized light.

One of the two laser lights L1 split by the beam splitter 41 enters the detour optical path 7 shown in FIG. 16. In the detour optical path 7 shown in FIG. 16, the vibrator 30 is irradiated with the laser light L1 four times. The other laser light L1 enters the object 14, and then enters the light receiving element 10 as the laser light L3.

The detour optical path 7 shown in FIG. 16 includes the beam splitter 72, the quarter-wave plate 73, the mirror 74, the mirror 75, the beam splitter 76, the quarter-wave plate 77, and the mirror 79.

The laser light L1 entering the detour optical path 7 passes through the beam splitter 72 and enters, via the quarter-wave plate 73, the first vibration portion 31 provided in the vibrator 30. Accordingly, a modulation signal is added to the laser light L1, and the laser light L21 is generated. The generated laser light L21 returns to the beam splitter 72 again via the quarter-wave plate 73. The laser light L21 enters the second vibration portion 32 provided in the vibrator 30 via the mirrors 74 and 75 and the beam splitter 76. Accordingly, a modulation signal is added to the laser light L21, and the laser light L22 is generated. The generated laser light L22 is reflected by the mirror 79 via the quarter-wave plate 77 and the beam splitter 76, and then enters the second vibration portion 32 again via the beam splitter 76 and the quarter-wave plate 77. Accordingly, a modulation signal is added to the laser light L22, and the laser light L23 is generated. The generated laser light L23 enters the first vibration portion 31 again via the quarter-wave plate 77, the beam splitter 76, the mirrors 75 and 74, the beam splitter 72, and the quarter-wave plate 73. Accordingly, a modulation signal is added to the laser light L23, and the laser light L24 is generated. The laser light L24 returns to the beam splitter 72 via the quarter-wave plate 73, and further enters the light receiving element 10 via the beam splitter 41 and the polarizer 46.

As described above, in the detour optical path 7 shown in FIG. 16, the vibrator 30 can be irradiated with the laser light four times. Accordingly, a phase of the laser light can be shifted in the same direction in the four times of irradiation. As a result, a phase shift amount of the laser light can be quadrupled, and the B value can be quadrupled.

In the second modification as described above, the same effects as those of the third embodiment can also be obtained.

Effects of Embodiments

As described above, the laser interferometer 1 according to the embodiment includes the light source 2, the optical modulator 12, the light receiving element 10 (photodetector), the calculator 52, and the signal generator 6. The light source 22 emits laser light. The optical modulator 12 includes the vibrator 30 that is driven by the drive signal Sd, and superimposes a modulation signal on the laser light using the vibrator 30. The light receiving element 10 receives laser light including the modulation signal and a sample signal derived from the object 14, and outputs a light receiving signal. The calculator 52 demodulates the sample signal from the light receiving signal based on the reference signal Ss. The signal generator 6 outputs the drive signal Sd and the reference signal Ss.

The optical modulator 12 includes the vibrator 30, the first optical modulator 33, the second optical modulator 34, and the detour optical path 7. The vibrator 30 includes the first vibration portion 31 and the second vibration portion 32 that vibrates in a phase opposite to a phase of the first vibration portion 31. The first optical modulator 33 is provided in the first vibration portion 31 and modulates the laser light. The second optical modulator 34 is provided in the second vibration portion 32, and modulates the laser light modulated by the first optical modulator 33. The detour optical path 7 causes the laser light modulated by the first optical modulator 33 to enter the second optical modulator 34.

According to such a configuration, since a phase deviation (B value) of the modulation signal can be increased, an S/N ratio of the signal processed by the calculator 52 can be increased. Accordingly, regardless of vibration conditions of the vibrator 30, the sample signal (Doppler signal) derived from the object 14 can be demodulated with higher accuracy. As a result, it is possible to implement the laser interferometer 1 having high calculation accuracy for a position and a velocity of the object.

The vibrator 30 may be a thickness-shear vibrator having the first surface 311, which is the first vibration portion 31, and the second surface 321, which is the second vibration portion 32, and having a thickness-shear vibration mode, the first surface 311 and the second surface 321 having a front and back relationship with each other. In this case, the first optical modulator 33 is the first diffraction grating 331 provided at the first surface 311 of the thickness-shear vibrator, and the second optical modulator 34 is the second diffraction grating 341 provided at the second surface 321 of the thickness-shear vibrator.

According to such a configuration, it is possible to reduce the size, weight, and power consumption of the laser interferometer 1. The thickness-shear vibrator is also useful in terms of impact resistance and temperature characteristics as compared with elements having other vibration modes.

The vibrator 30 may be a tuning fork type vibrator including the first arm 312 that is the first vibration portion 31 and the second arm 322 that is the second vibration portion 32. In this case, the first optical modulator 33 is the first reflective surface 332 provided at the surface of the first arm 312, and the second optical modulator 34 is the second reflective surface 342 provided at the surface of the second arm 322.

According to such a configuration, it is possible to reduce the size, weight, and power consumption of the laser interferometer 1. Since it is not necessary to provide a diffraction grating and the like in the tuning fork type vibrator and the surfaces of the electrode can be used as the first optical modulator 33 and the second optical modulator 34, it is also useful in that the structure is easily simplified.

The tuning fork type vibrator may have an in-plane vibration mode. The in-plane vibration mode is a mode in which the tuning fork type vibrator vibrates in a plane of an arm forming surface in which the first arm 312 and the second arm 322 are arranged side by side.

Accordingly, the tuning fork type vibrator can secure a large amplitude of the first reflective surface 332 and the second reflective surface 342. Accordingly, the B value can be further increased.

The tuning fork type vibrator may have an out-of-plane vibration mode. The out-of-plane vibration mode is a mode in which the tuning fork type vibrator vibrates in a direction intersecting with the arm forming surface in which the first arm 312 and the second arm 322 are arranged side by side.

Accordingly, the tuning fork type vibrator can secure a large amplitude of the first reflective surface 332 and the second reflective surface 342. Accordingly, the B value can be further increased. By using the out-of-plane vibration mode in modulation of the laser light, the first reflective surface 332 and the second reflective surface 342 having a wide area can be used as light reflective surfaces. Since the first reflective surface 332 and the second reflective surface 342 have high tolerance to deviation of an irradiation position of the laser light, the laser interferometer 1 having excellent manufacturability can be implemented.

The signal generator 6 includes the oscillation circuit 61 that uses the vibrator 30 as a signal source, outputs the drive signal Sd to the vibrator 30, and outputs the reference signal Ss by oscillating the vibrator 30.

Accordingly, the drive signal Sd and the reference signal Ss are affected in the same way when subjected to disturbance. Accordingly, the modulation signal, which is added via the vibrator 30 driven by the drive signal Sd, and the reference signal Ss are also affected in the same way. Therefore, when the modulation signal and the reference signal Ss are subjected to calculation in the calculator 52, the influence of disturbance included in both of the modulation signal and the reference signal Ss can be offset or reduced in the process of calculation. As a result, the calculator 52 can accurately obtain the position and the velocity of the object 14 even when subjected to disturbance.

The vibrator 30 may be a quartz crystal vibrator. Since the quartz crystal vibrator has a high Q value, it is possible to add a modulation signal having a high S/N ratio to the laser light L1.

The optical modulator 12 has a function of modulating the laser light L1 n times or more, n being an integer of 2 or more. The detour optical path 7 may satisfy $Lt \leq 9 \times 10^6 / f_M$, wherein $f_M$ [Hz] is a frequency when the vibrator 30 is driven by the drive signal Sd, and Lt [m] is an optical distance by which the laser light travels during a period from a time point at which the laser light is modulated once to a time point at which the laser light is modulated n times.

Accordingly, it is possible to sufficiently reduce an influence of a time lag between the first phase modulation and the n-th phase modulation on the B value. As a result, it is possible to increase the probability of phase modulation in a direction in which the B value is increased in all irradiation from the first irradiation to the n-th irradiation.

The detour optical path 7 may satisfy $n \leq c / (4 L f_M)$, wherein L [m] is an optical distance by which the laser light travels during a period from a time point at which the laser light is modulated n−1 times to a time point at which the laser light is modulated n times, and c [m/s] is a velocity of light.

Accordingly, it is possible to contribute to an increase in the B value in each irradiation, and thus it is possible to increase the B value more reliably. As a result, the S/N ratio of the preprocessed signal output by the preprocessing unit 53 can be more reliably increased.

Although the laser interferometer according to the present disclosure has been described above based on the shown embodiments, the laser interferometer according to the present disclosure is not limited to above-described embodiments and the modifications thereof. A configuration of each unit can be replaced with a configuration having the same function. Any other components may be added to the laser interferometer according to the above-described embodiments and the modifications thereof. Further, the laser interferometer according to the present disclosure may include two or more of the above-described embodiments and the modifications thereof. Each functional unit provided in the laser interferometer according to the present disclosure may be divided into a plurality of elements, or a plurality of functional units may be integrated into one.

The laser interferometer according to the present disclosure can be applied to, for example, a vibration meter, an inclinometer, and a distance meter (a length measuring device), in addition to the above-described displacement gauge or velocity meter. Examples of application of the laser interferometer according to the present disclosure include an optical comb interference measurement technique that enables distance measurement, 3D imaging, spectroscopy, and the like, an optical fiber gyro that implements an angular velocity sensor, an angular acceleration sensor, and the like, and a Fourier spectrometer including a moving mirror device.

Two or more of the light source, the optical modulator, and the light receiving element may be mounted on the same substrate. Accordingly, a size and a weight of the interference optical system can be easily reduced, and assembling of the interference optical system can be made easier.

Although a so-called Michelson interference optical system is provided in the above-described embodiments and the modifications thereof, the laser interferometer according to the present disclosure can also be applied to an interference optical system of another type such as a Mach-Zehnder interference optical system.

What is claimed is:

1. A laser interferometer comprising:
a light source configured to emit laser light;
an optical modulator including a vibrator driven by a drive signal and configured to superimpose a modulation signal on the laser light using the vibrator;
a photodetector configured to receive the laser light including the modulation signal and a sample signal derived from an object and output a light receiving signal;
a calculator configured to demodulate the sample signal from the light receiving signal based on a reference signal; and
a signal generator configured to output the drive signal and the reference signal, wherein
the optical modulator includes
the vibrator including a first vibration portion and a second vibration portion that vibrates in a phase opposite to that of the first vibration portion,
a first optical modulator provided in the first vibration portion and configured to modulate the laser light,
a second optical modulator provided in the second vibration portion and configured to modulate the laser light modulated by the first optical modulator, and
a detour optical path configured to cause the laser light modulated by the first optical modulator to enter the second optical modulator.

2. The laser interferometer according to claim 1, wherein the vibrator is a thickness-shear vibrator having a first surface, which is the first vibration portion, and a second surface, which is the second vibration portion, and having a thickness-shear vibration mode, the first surface and the second surface having a front and back relationship with each other,
the first optical modulator is a first diffraction grating provided at the first surface of the thickness-shear vibrator, and
the second optical modulator is a second diffraction grating provided at the second surface of the thickness-shear vibrator.

3. The laser interferometer according to claim 2, wherein the signal generator includes an oscillation circuit that uses the vibrator as a signal source, outputs the drive signal to the vibrator, and outputs the reference signal by oscillating the vibrator.

4. The laser interferometer according to claim 3, wherein the optical modulator modulates the laser light n times or more, n being an integer of 2 or more, and the detour optical path satisfies $Lt \leq 9 \times 10^6 / f_M$, wherein $f_M$ [Hz] is a frequency of the vibrator, and Lt [m] is an optical distance by which the laser light travels during a period from a first time point at which the laser light is modulated first time to a second time point at which the laser light is modulated n times.

5. The laser interferometer according to claim 4, wherein the detour optical path satisfies $n \leq c/(4Lf_M)$, wherein L [m] is an optical distance by which the laser light travels during a period from a third time point at which the laser light is modulated n−1 times to the second time point at which the laser light is modulated n times, and c [m/s] is a velocity of light.

6. The laser interferometer according to claim 1, wherein the vibrator is a tuning fork type vibrator having a first arm that is the first vibration portion and a second arm that is the second vibration portion,
the first optical modulator is a first reflective surface provided at a surface of the first arm, and
the second optical modulator is a second reflective surface provided at a surface of the second arm.

7. The laser interferometer according to claim 6, wherein the tuning fork type vibrator has an in-plane vibration mode in which the tuning fork type vibrator vibrates in a plane of an arm forming surface in which the first arm and the second arm are arranged side by side.

8. The laser interferometer according to claim 6, wherein the tuning fork type vibrator has an out-of-plane vibration mode in which the tuning fork type vibrator vibrates in a direction intersecting with an arm forming surface in which the first arm and the second arm are arranged side by side.

9. The laser interferometer according to claim 6, wherein the signal generator includes an oscillation circuit that uses the vibrator as a signal source, outputs the drive signal to the vibrator, and outputs the reference signal by oscillating the vibrator.

10. The laser interferometer according to claim 9, wherein the optical modulator modulates the laser light n times or more, n being an integer of 2 or more, and the detour optical path satisfies $Lt \leq 9 \times 10^6 / f_M$, wherein $f_M$ [Hz] is a frequency of the vibrator, and Lt [m] is an optical distance by which the laser light travels during a period from a first time point at which the laser light is modulated first time to a second time point at which the laser light is modulated n times.

11. The laser interferometer according to claim 10, wherein the detour optical path satisfies $n \leq c/(4Lf_M)$, wherein L [m] is an optical distance by which the laser light travels during a period from a third time point at which the laser light is modulated n−1 times to the second time point at which the laser light is modulated n times, and c [m/s] is a velocity of light.

12. The laser interferometer according to claim 1, wherein the signal generator includes an oscillation circuit that uses the vibrator as a signal source, outputs the drive signal to the vibrator, and outputs the reference signal by oscillating the vibrator.

13. The laser interferometer according to claim 1, wherein the vibrator is a quartz crystal vibrator.

14. The laser interferometer according to claim 1, wherein the optical modulator modulates the laser light n times or more, n being an integer of 2 or more, and the detour optical path satisfies $Lt \leq 9 \times 10^6 / f_M$, wherein $f_M$ [Hz] is a frequency of the vibrator, and Lt [m] is an optical distance by which the laser light travels during a period from a first time point at which the laser light is modulated first time to a second time point at which the laser light is modulated n times.

15. The laser interferometer according to claim 14, wherein the detour optical path satisfies $n \leq c/(4Lf_M)$, wherein L [m] is an optical distance by which the laser light travels during a period from a third time point at which the laser light is modulated n−1 times to the second time point at which the laser light is modulated n times, and c [m/s] is a velocity of light.

* * * * *